(12) United States Patent
Maenaka et al.

(10) Patent No.: US 7,123,781 B2
(45) Date of Patent: Oct. 17, 2006

(54) IMAGE INTERPOLATING METHOD

(75) Inventors: Akihiro Maenaka, Kadoma (JP); Ryuhei Amano, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 515 days.

(21) Appl. No.: 10/397,525

(22) Filed: Mar. 27, 2003

(65) Prior Publication Data

US 2003/0185464 A1    Oct. 2, 2003

(30) Foreign Application Priority Data

Mar. 27, 2002 (JP) ............................. 2002-088523

(51) Int. Cl.
*G06K 9/32* (2006.01)
*G06K 9/40* (2006.01)
(52) U.S. Cl. ...................... 382/300; 382/266
(58) Field of Classification Search ............... 382/266, 382/267, 269, 300; 345/606, 611
See application file for complete search history.

(56) References Cited

U.S. PATENT DOCUMENTS 5,886,745 A * 3/1999 Muraji et al. ............... 348/448

FOREIGN PATENT DOCUMENTS

| JP | 63-187785 | 8/1988 |
| JP | 2001-346037 | 12/2001 |

OTHER PUBLICATIONS

U.S. Appl. No. 09/821,452 to Maenaka with common assignee to the present application to Sanyo. (copy of the claims are enclosed).*

* cited by examiner

*Primary Examiner*—Bhavesh Mehta
*Assistant Examiner*—Wes Tucker
(74) *Attorney, Agent, or Firm*—McDermott Will & Emery LLP

(57) ABSTRACT

Assuming that an original pixel adjacent to a first original pixel and opposite to a second original pixel is a third original pixel, and an original pixel adjacent to the second original pixel and opposite to the first original pixel is a fourth original pixel, and letting $d1$ be pixel data on the first original pixel, $d2$ be pixel data on the second original pixel, $d3$ be pixel data on the third original pixel, and $d4$ be pixel data on the fourth original pixel, a first edge component E is calculated on the basis of an equation for operation $E=-d3+d1+d2-d4$ in the first step, and a second edge component Es is calculated on the basis of an equation for operation $Es=|d3+d1-d2-d4|$.

17 Claims, 15 Drawing Sheets

IMAGE INTERPOLATING METHOD

BACKGROUND OF THE INVENTION

1. Field of the Invention

The present invention relates to an image interpolating method for interpolating an image.

2. Description of the Prior Art

Conventionally in cases such as a case where an interlace image is converted into a progressive image, a case where an image is enlarged, and a case where the resolution of an image is enhanced, various methods for interpolating an image have been proposed using pixel data on adjacent original pixels (corresponding to the amount of data representing luminance on a display).

Typical examples of an image interpolating method are a simple interpolating method and a linear interpolating method. The simple interpolating method is a method of giving pixel data on either one of pixels adjacent to a pixel to be interpolated on the upper and lower sides (or on the right and left sides) to the pixel to be interpolated as pixel data. The linear interpolating method is a method of giving the average of pixel data on pixels adjacent to a pixel to be interpolated on the upper and lower sides (or on the right and left sides) to the pixel to be interpolated as pixel data.

In the simple interpolating method, however, the pixel data on the pixel adjacent to the pixel to be interpolated is given as it is. When there is a diagonal edge portion in an image reproduced on a display or the like, therefore, backlash occurs in the edge portion. On the other hand, in the linear interpolating method, the average of the pixel data on the pixels adjacent to the pixel to be interpolated on the upper and lower sides (on the right and left sides) is given. Accordingly, the vicinity of the pixel to be interpolated is an edge portion. When the difference between the pixel data on the pixels adjacent to the pixel to be interpolated on the upper and lower sides (on the right and left sides) is large, the interpolated pixel takes an intermediate value, so that the edge portion is blurred.

Therefore, the applicants of the present invention already have developed an image interpolating method capable of preventing, in interpolating an image, backlash and blur from occurring in an edge portion of the image as well as capable of reproducing a smooth image.

Description is made of an image interpolating method already developed by the applicants of the present invention (hereinafter referred to as the conventional method).

A two-dimensional image has a two-dimensional expanse in the horizontal direction and the vertical direction. In order to simplify the description, however, description is made of a method of one-dimensional interpolation in the vertical direction.

FIG. 1 illustrates the relationship between original pixels and a pixel to be interpolated.

In FIG. 1, lines (n−1), n, (n+1), and (n+2) are horizontal lines in the original image, and lines (i−1), i, and (i+1) are horizontal lines to be interpolated. Description is herein made of a case where a pixel (hereinafter referred to as an interpolation pixel X) on the line i is interpolated.

In the following description, pixel data on original pixels D01 to D35 and the interpolation pixel X are respectively denoted by d01 to d35 and x. In this example, the pixel data shall be composed of eight bits, and black data and white data shall be respectively "0" and "255".

FIG. 2 shows the procedure for finding the pixel data x on the interpolation pixel X by the conventional method.

First, an edge component E is calculated in order to judge whether or not the interpolation pixel X exists in the vicinity of an edge of an original image (step 1). That is, the edge component E is found from the following equation (1) using the pixel data on the two original pixels D01 and D13 just above the interpolation pixel X and the two original pixels D23 and D33 just below the interpolation pixel X:

$$E = -d03 + d13 + d23 - d33 \qquad (1)$$

The edge component E takes a relatively large negative value when the interpolation pixel X exists in the vicinity of a black edge of the original image, while taking a relatively large positive value when the interpolation pixel X exists in the vicinity of a white edge of the original image.

A range S where the pixel data x on the interpolation pixel X is settable is then determined on the basis of the edge component E (step 2).

Description is made of a method of determining the settable range S on the basis of FIGS. 3a and 3b. In FIGS. 3a and 3b, $d_{max}$ denotes the larger one of the pixel data d13 and d23 on the original pixels D13 and D23, and $d_{min}$ denotes the smaller one of the pixel data d13 and d23. Further, dc denotes the average $(d_{max}+d_{min})/2$ of $d_{max}$ and $d_{min}$.

(1) Range S Where Pixel Data x is Settable When $E \geq 0$

When $E \geq 0$, the range S where the pixel data x is settable shall be a range of $d_{min} \times \alpha + dc \times (1-\alpha) \leq S \leq d_{max} \times \alpha + dc \times (1-\alpha) + E \times \gamma$, where $\alpha$ and $\gamma$ are variables which can be controlled from the exterior.

That is, when the edge component E is not less than zero, the range S where the pixel data x is settable is a range expanded upward by the value of $\gamma \cdot E$ from a range $[d_{min} \times \alpha + dc \times (1-\alpha) \leq x \leq d_{max} \times \alpha + dc \times (1-\alpha)]$ centered around dc.

In this case, it is presumed that the interpolation pixel X exists in the vicinity of the white edge of the original image, to set the settable range S to a range close to $d_{max}$ in the range of $d_{min}$ to $d_{max}$.

(2) Range S Where Pixel Data x is Settable When E<0

When E<0, the range S where the pixel data x is settable shall be a range of $d_{min} \times \alpha + dc \times (1-\alpha) + E \times \gamma \leq S \leq d_{max} \times \alpha + dc \times (1-\alpha)$.

That is, when the edge component E is less than zero, the range S where the pixel data x is settable is a range expanded downward by the value of $\gamma \cdot E$ from a range $[d_{min} \times \alpha + dc \times (1-\alpha) \leq x \leq d_{max} \times \alpha + dc \times (1-\alpha)]$ centered around dc.

In this case, it is presumed that the interpolation pixel X exists in the vicinity of the black edge of the original image, to set the settable range S to a range close to $d_{min}$ in the range of $d_{min}$ to $d_{max}$.

Candidates for the pixel data x on the interpolation pixel X are then found from the range S where the pixel data x is settable on the basis of the pixel data on the opposed pixels between which the interpolation pixel X is sandwiched diagonally (step 3).

In finding the candidates for the pixel data x on the interpolation pixel X, a correlation value L1 between the pixel data on the opposed pixels D12 and D24 and the pixel data x on the interpolation pixel X and a correlation value R1 between the pixel data on the opposed pixels D14 and D22 and the pixel data x on the interpolation pixel X are employed. Therefore, methods of respectively calculating the correlation values L1 and R1 will be first described.

The correlation value L1 between the pixel data on the opposed pixels D12 and D24 and the pixel data x on the interpolation pixel X is expressed by the following equation (2), and the correlation value R1 between the pixel data on the opposed pixels D14 and D22 and the pixel data x on the interpolation pixel X is expressed by the following equation (3):

$$L = |d12-x| + |d24-x| + \beta1 \times Hl - \beta2 \times Vl \quad (2)$$

$$R = |d14-x| + |d22-x| + \beta1 \times Hr - \beta2 \times Vr \quad (3)$$

In the foregoing equations (2) and (3), β1 and β2 are valuables which can be controlled from the exterior. In the foregoing equation (2), Hl denotes a horizontal correlation intensity, and is expressed by the following equation (4). Further, Vl denotes a vertical correlation intensity, and is expressed by the following equation (5).

$$Hl = \text{MAX}(|d11-d12|+|d12-d13|, |d23-d24|+|d24-d25|) \quad (4)$$

$$Vl = \text{MIN}(|d02-d12|+|d12-d22|, |d14-d24|+|d24-d34|) \quad (5)$$

MAX (a, b) is a sign indicating that the larger one of a and b is selected. MIN (a, b) is a sign indicating that the smaller one of a and b is selected.

Hl denotes the larger one of a primary differential value (|d11−d12|+|d12−d13|) in the horizontal direction corresponding to the pixel D12 and a primary differential value (|d23−d24|+|d24−d25|) in the horizontal direction corresponding to the pixel D24. Further, Vl denotes the smaller one of a primary differential value (|d02−d12|+|d12−d22|) in the vertical direction corresponding to the pixel D12 and a primary differential value (|d14−d24|+|d24−d34|) in the vertical direction corresponding to the pixel D24.

In the foregoing equation (3), Hr denotes a horizontal correlation intensity, and is expressed by the following equation (6), and Vr denotes a vertical correlation intensity, and is expressed by the following equation (7):

$$Hr = \text{MAX}(|d13-d14|+|d14-d15|, |d21-d22|+|d22-d23|) \quad (6)$$

$$Vr = \text{MIN}(|d04-d14|+|d14-d24|, |d12-d22|+|d22-d32|) \quad (7)$$

Hr denotes the larger one of a primary differential value (|d13−d14|+|d14−d15|) in the horizontal direction corresponding to the pixel D14 and a primary differential value (|d21−d22|+|d22−d23|) in the horizontal direction corresponding to the pixel D22. Further, Vr denotes the smaller one of a primary differential value (|d12−d22|+|d22−d32|) in the vertical direction corresponding to the pixel D22 and a primary differential value (|d04−d14|+51 d14−d24|) in the vertical direction corresponding to the pixel D14.

There are two methods of finding the candidates for the pixel data x on the interpolation pixel X. The methods will be described.

(1) Description of First Method

All the pixel data x in the settable range S are respectively substituted in the foregoing equation (2) expressing a correlation value L between the pixel data on the two opposed pixels D12 and D24 between which the interpolation pixel X is sandwiched diagonally (diagonally to the upper left) and the pixel data x on the interpolation pixel X, to find the minimum correlation value $L_{min}$ and pixel data xl in a case where the minimum correlation value $L_{min}$ is given.

Similarly, all the pixel data x in the settable range S are respectively substituted in the foregoing equation (3) expressing a correlation value R between the pixel data on the two opposed pixels D14 and D22 between which the interpolation pixel X is sandwiched diagonally (diagonally to the upper right) and the pixel data x on the interpolation pixel X, to find the minimum correlation value $R_{min}$ and pixel data xr in a case where the minimum correlation value $R_{min}$ is given.

The found pixel data xl and xr are thus candidates for the pixel data x on the interpolation pixel X. In such a way, however, a plurality of pixel data may, in some cases, be applicable as the pixel data xl in the case where the minimum correlation value $L_{min}$ is given. Similarly, a plurality of pixel data may, in some cases, be applicable as the pixel data xr in the case where the minimum correlation value $R_{min}$ is given.

When the plurality of pixel data are applicable as the pixel data xl in the case where the minimum correlation value $L_{min}$ is given, the average of the pixel data may be determined as the pixel data xl in the case where the minimum correlation value $L_{min}$ is given. Similarly, when the plurality of pixel data are applicable as the pixel data xr in the case where the minimum correlation value $R_{min}$ is given, the average of the pixel data may be determined as the pixel data xr in the case where the minimum correlation value $R_{min}$ is given.

(2) Description of Second Method

FIG. 4 illustrates the relationship between the correlation value L and the pixel data x. In FIG. 4, $x_{min}$ denotes the smaller one of the pixel data d12 and d24, and $x_{max}$ denotes the larger one of the pixel data d12 and d24. Further, $xd = x_{max} - x_{min} + \beta1 \times Hl - \beta2 \times Vl$.

If $xd = x_{max} - x_{min} + \beta1 \times Hl - \beta2 \times Vl$, the correlation value L in the foregoing equation (2) can be changed, as expressed by the following equation (8). The correlation value R can be also similarly changed.

$$L = xd + 2(x - x_{max}) \quad (x > x_{max}) \quad (8)$$
$$L = xd \quad (x_{min} \leq x \leq x_{max})$$
$$L = xd + 2(x_{min} - x) \quad (x < x_{min})$$

Description is now made of methods of respectively finding the minimum correlation values $L_{min}$ and $R_{min}$ and the pixel data xl and xr (the second method). Description is herein made of the method of finding the minimum correlation value $L_{min}$ and the pixel data xl.

FIGS. 5a to 5f show graphs of the correlation value L against the pixel data x and a range where the pixel data x is settable.

In FIGS. 5a to 5f, xa denotes the minimum of the pixel data x in the settable range, and xb denotes the maximum of the pixel data x in the settable range.

① In the case of $xb \leq x_{min}$

When the range where the pixel data x is settable is not more than $x_{min}$, as shown in FIG. 5a, the correlation value L is the minimum in the pixel data xb. Consequently, the minimum correlation value $L_{min}$ is $xd+2(x_{min}-xb)$. Further, the pixel data xl at this time is xb.

② In the case of $x_{max} \leq xa$

When the range where the pixel data x is settable is not less than $x_{min}$, as shown in FIG. 5b, the correlation value L is the minimum in the pixel data xa. Consequently, the minimum correlation value $L_{min}$ is $xd+2(xa-x_{max})$. Further, the pixel data xl at this time is xa.

③ In the case of $x_{min} \leq xa$ and $xb \leq x_{max}$

When the range where the pixel data x is settable is from the pixel data $x_{min}$ to $x_{max}$, as shown in FIG. 5c, the correlation value L is the minimum xd in the arbitrary pixel data x in the settable range. Consequently, the minimum correlation value $L_{min}$ is xd. In this case, a value (xa+xb)/2 at the center of the settable range is determined as the pixel data xl.

④ In the case of xa<$x_{min}$ and $x_{max}$<xb

When the range where the pixel data x is settable is a range wider than the range of the pixel data $x_{min}$ to $x_{max}$, as shown in FIG. 5d, the correlation value L is the minimum xd in the arbitrary pixel data x in the range of the pixel data $x_{min}$ to $x_{max}$. Consequently, the minimum correlation value $L_{min}$ is xd. In this case, the average $(x_{min}+x_{max})/2$ of the pixel data $x_{min}$ and $x_{max}$ is determined as the pixel data xl.

⑤ In the case of xa<$x_{min}$ and $x_{min}$<xb≦$x_{max}$

When the range where the pixel data x is settable is shifted leftward from the range of the pixel data $x_{min}$ to $x_{max}$, as shown in FIG. 5e, the correlation value L is the minimum xd in the arbitrary pixel data x in the range of the pixel data $x_{min}$ to xb. Consequently, the minimum correlation value $L_{min}$ is xd. In this case, the average $(x_{min}+xb)/2$ of the pixel data $x_{min}$ and xb is determined as the pixel data xl.

⑥ In the case of $x_{min}$≦xa<$x_{max}$ and $x_{max}$≦xb

When the range where the pixel data x is settable is shifted rightward from the range of the pixel data $x_{min}$ to $x_{max}$, as shown in FIG. 5f, the correlation value L is the minimum xd in the arbitrary pixel data x in the range of the pixel data xa to $x_{max}$. Consequently, the minimum correlation value $L_{min}$ is xd. In this case, the average $(xa+x_{max})/2$ of the pixel data xa and $x_{max}$ is determined as the pixel data xl.

The minimum correlation value $L_{min}$ and the pixel data xl are thus found. The minimum correlation value $R_{min}$ and the pixel data xr are also found in the same manner as the minimum correlation value $L_{min}$ and the pixel data xl.

When the minimum correlation values $L_{min}$ and $R_{min}$ and the pixel data xl and xr in cases where the minimum correlation values are respectively given are found in the step 3, the pixel data in the case where the smaller one of the minimum correlation values $L_{min}$ and $R_{min}$ is given is extracted (step 4).

When the minimum correlation values $L_{min}$ and $R_{min}$ differ from each other, one pixel data is extracted. When the minimum correlation values $L_{min}$ and $R_{min}$ are the same, two pixel data are extracted.

When one pixel data xl or xr is extracted in the step 4 (YES in step 5), the extracted pixel data is determined as the pixel data x on the interpolation pixel X (step 6). When two (a plurality of) pixel data xl and xr are selected in the step 4 (NO in step 5), the average of the pixel data xl and xr is determined as the pixel data x on the interpolation pixel X (step 7).

The details are as follows:

① if $L_{min}$<$R_{min}$, then x=xl
② if $L_{min}$>$R_{min}$, then x=xr
③ if $L_{min}$=$R_{min}$, then x=(xl+xr)/2

Although in the foregoing step 3, two sets are selected as the set of opposed pixels between which the interpolation pixel X is sandwiched diagonally, two or more sets may be selected. For example, six sets of opposed pixels, for example, D10 and D26, D11 and D25, D12 and D24, D14 and D22, D15 and D21, and D16 and D20 may be selected, as shown in FIG. 6. In this case, pixel data in a case where the minimum correlation value is given is found in the step 3 for each of the sets of opposed pixels. That is, six candidates for the pixel data are found.

When the number of minimums of the minimum correlation values corresponding to the six sets of opposed pixels is three or more, three or more pixel data are extracted from the six candidates for the pixel data in the step 4.

When three or more pixel data are selected in the step 4, there are three methods, as described below, as a method of determining the pixel data x on the interpolation pixel X.

The first method is one for calculating the average of three or more pixel data selected in the step 4 and determining the result of the calculation as the pixel data x on the interpolation pixel X. The second method is one for extracting the maximum and the minimum of three or more pixel data selected in the step 4, calculating the average of the maximum and the minimum, and determining the result of the calculation as the pixel data x on the interpolation pixel X.

The third method is one for selecting, out of three or more pixel data selected in the step 4, the pixel data obtained from the opposed pixels in closest proximity to the interpolation pixel X, and determining the selected pixel data as the pixel data x on the interpolation pixel X. When there exist two pixel data obtained from the opposed pixels in closest proximity to the interpolation pixel X, however, the average of the pixel data is calculated, and the result of the calculation is determined as the pixel data x on the interpolation pixel X.

When six sets of opposed pixels are selected, as shown in FIG. 6, as the set of opposed pixels between which the interpolation pixel X is sandwiched diagonally, the correlation values L2 and R2 are respectively expressed by the following equations (9) and (10), for example:

$$L2=|d11-x|+|d25-x|+\beta1 \times Hl_2-\beta2 \times Vl_2 \quad (9)$$

$$R2=|d15-x|+|d21-x|+\beta1 \times Hr_2-\beta2 \times Vr_2 \quad (10)$$

$Hl_2$ and $Vl_2$ in the foregoing equation (9) are respectively expressed by the following equations (11) and (12):

$$Hl_2=\text{MAX}(|d10-d11|+|d11-d12|, |d24-d25|+|d25-d26|) \quad (11)$$

$$Vl_2=\text{MIN}(|d01-d11|+|d11-d21|, |d15-d25|+|d25-d35|) \quad (12)$$

$Hr_2$ and $Vr_2$ in the foregoing equation (10) are respectively expressed by the following equations (13) and (14):

$$Hr_2=\text{MAX}(|d14-d15|+|d15-d16|, |d20-d21|+|d21-d22|) \quad (13)$$

$$Vr_2=\text{MIN}(|d05-d15|+|d15-d25|, |d11-d21|+|d21-d31|) \quad (14)$$

SUMMARY OF THE INVENTION

The present invention is an improvement of a conventional method, and has for its object to provide an image interpolating method capable of preventing, in interpolating an image, backlash and blur from occurring in an edge portion of the image as well as capable of reproducing a smooth image.

In an image interpolating method for interpolating a pixel at an intermediate position between a first original pixel and a second original pixel adjacent to the first original pixel, a first image interpolating method according to the present invention is characterized by comprising a first step of calculating an edge component for judging whether or not an interpolation pixel exists in the vicinity of an edge position of original image data; a second step of finding a range where pixel data on the interpolation pixel is settable on the basis of the edge component and pixel data on the first and second original pixels; a third step of selecting a plurality of sets of opposed pixels between which the interpolation pixel is sandwiched diagonally, and finding for each of the sets the pixel data on the interpolation pixel in a case where a correlation value represented by the sum of the absolute values of the differences between the pixel data on the interpolation pixel and pixel data on the opposed pixels and a correction value calculated on the basis of the pixel data on the original pixel peripheral to each of the opposed pixels is the minimum in the range where the pixel data on the interpolation pixel is settable and the minimum correlation value; a fourth step of finding temporary pixel data on the interpolation pixel on the basis of the pixel data on the interpolation pixel in the case where the correlation value is the minimum and the minimum correlation value which are found for each of the sets; a fifth step of calculating a linear correlation value and a linear interpolation value between the first original pixel and the second original pixel; and a sixth step of calculating the final pixel data on the interpolation pixel on the basis of the minimum correlation value found in the third step, the linear correlation value calculated in the fifth step, the temporary pixel data calculated in the fourth step, and the linear interpolation value calculated in the fifth step.

The second image interpolating method according to the present invention is characterized in that in the first image interpolating method, assuming an original pixel adjacent to the first original pixel and opposite to the second original pixel is a third original pixel, and an original pixel adjacent to the second original pixel and opposite to the first original pixel is a fourth original pixel, and letting d1 be the pixel data on the first original pixel, d2 be the pixel data on the second original pixel, d3 be pixel data on the third original pixel, and d4 be pixel data on the fourth original pixel, a first edge component E is calculated on the basis of an equation for operation E=−d3+d1+d2−d4, and a second edge component Es is calculated on the basis of an equation for operation Es=|d3+d1−d2−d4| in the first step.

The third image interpolating method according to the present invention is characterized in that in the second image interpolating method, letting E be the first edge component found in the first step, Es be the second edge component found in the first step, dc be the average of the pixel data on the first original pixel and the pixel data on the second original pixel, and γs and γ be predetermined factors, a range S where the pixel data on the interpolation pixel is settable is found on the basis of the following expressions in the second step:

if $E \geq 0$, then $dc - Es \times \gamma s \leq S \leq dc + Es \times \gamma s + E \times \gamma$, if $E < 0$, then $dc - Es \times \gamma s + E \times \gamma \leq S \leq dc + Es \times \gamma s$ (15)

The fourth image interpolating method according to the present invention is characterized in that in the third image interpolating method, when a direction connecting the first original pixel and the second original pixel is defined as an up-and-down direction, and a direction perpendicular to the up-and-down direction is defined as a right-and-left direction, assuming that the first original pixel is just above the second original pixel, and letting D12 and D24 be respectively the upper opposed pixel and the lower opposed pixel in the set of opposed pixels between which the interpolation pixel is sandwiched diagonally, d12 and d24 be respectively the pixel data on the opposed pixels D12 and D24, β1 and β2 be respectively predetermined factors, Hl be the larger one of a horizontal correlation intensity on the side of the one opposed pixel D12 and a horizontal correlation intensity on the side of the other opposed pixel D24, Vl be the smaller one of a vertical correlation intensity on the side of the one opposed pixel D12 and a vertical correlation intensity on the side of the other opposed pixel D24, and x be the pixel data in the settable range S found in the third step, an equation for calculating a correlation value L corresponding to the set is expressed by the following equation:

$L = |d12 - x| + |d24 - x| + \beta 1 \cdot Hl - \beta 2 \cdot Vl$ (16)

The fifth image interpolating method according to the present invention is characterized in that in the fourth image interpolating method, the vertical correlation intensity on the side of the upper opposed pixel D12 is a primary differential value in the vertical direction corresponding to the opposed pixel, and the vertical correlation intensity on the side of the lower opposed pixel D24 is a primary differential value in the vertical direction corresponding to the opposed pixel.

The sixth image interpolating method according to the present invention is characterized in that in the fourth image interpolating method, the vertical correlation intensity on the side of the upper opposed pixel D12 is a secondary differential value in the vertical direction corresponding to the opposed pixel, and the vertical correlation intensity on the side of the lower opposed pixel D24 is a secondary differential value in the vertical direction corresponding to the opposed pixel.

The seventh image interpolating method according to the present invention is characterized in that in the fifth or sixth image interpolating method, when the sum of a primary differential value in the horizontal direction corresponding to an original pixel just above a target original pixel, a value which is two times a primary differential value in the horizontal direction corresponding to the target original pixel, and a primary differential value in the horizontal direction corresponding to an original pixel just below the target original pixel is defined as a horizontal correlation intensity in a predetermined region centered around the target original pixel, in a case where the upper opposed pixel D12 is the first pixel in the horizontal direction from the first original pixel, and the lower opposed pixel D24 is the first pixel in the horizontal direction from the second original pixel, the horizontal correlation intensity on the side of the upper opposed pixel D12 is a horizontal correlation intensity in a predetermined region centered around the opposed pixel D12, and the horizontal correlation intensity on the side of the lower opposed pixel D24 is a horizontal correlation intensity in a predetermined region centered around the opposed pixel D24.

The eighth image interpolating method according to the present invention is characterized in that in the seventh image interpolating method, when the upper opposed pixel D12 is the n-th pixel in the horizontal direction from the first original pixel, and the lower opposed pixel D24 is the n-th pixel in the horizontal direction from the second original pixel, the horizontal correlation intensity on the side of the upper opposed pixel D12 is a value obtained by adding the sum of horizontal correlation intensities in predetermined regions centered around the original pixels between the first original pixel and the opposed pixel D12 to the horizontal correlation intensity in the predetermined region centered around the opposed pixel D12, and the horizontal correlation intensity on the side of the lower opposed pixel D24 is a value obtained by adding the sum of horizontal correlation intensities in predetermined regions centered around the original pixels between the second original pixel and the opposed pixel D24 to the horizontal correlation intensity in the predetermined region centered around the opposed pixel D24.

The ninth image interpolating method according to the present invention is characterized in that in the fifth or sixth image interpolating method, when the sum of a secondary differential value in the horizontal direction corresponding to an original pixel just above a target original pixel, a value which is two times a secondary differential value in the horizontal direction corresponding to the target original pixel, and a secondary differential value in the horizontal direction corresponding to an original pixel just below the target original pixel is defined as a horizontal correlation intensity in a predetermined region centered around the target original pixel, in a case where the upper opposed pixel D12 is the first pixel in the horizontal direction from the first original pixel, and the lower opposed pixel D24 is the first pixel in the horizontal direction from the second original pixel, the horizontal correlation intensity on the side of the upper opposed pixel D12 is a horizontal correlation intensity in a predetermined region centered around the opposed pixel D12, and the horizontal correlation intensity on the side of the lower opposed pixel D24 is a horizontal correlation intensity in a predetermined region centered around the opposed pixel D24.

The tenth image interpolating method according to the present invention is characterized in that in the ninth image interpolating method, when the upper opposed pixel D12 is the n-th pixel in the horizontal direction from the first original pixel, and the lower opposed pixel D24 is the n-th pixel in the horizontal direction from the second original pixel, the horizontal correlation intensity on the side of the upper opposed pixel D12 is a value obtained by adding the sum of horizontal correlation intensities in predetermined regions centered around the original pixels between the first original pixel and the opposed pixel D12 to the horizontal correlation intensity in the predetermined region centered around the opposed pixel D12, and the horizontal correlation intensity on the side of the lower opposed pixel D24 is a value obtained by adding the sum of horizontal correlation intensities in predetermined regions centered around the original pixels between the second original pixel and the opposed pixel D24 to the horizontal correlation intensity in the predetermined region centered around the opposed pixel D24.

The eleventh image interpolating method according to the present invention is characterized in that in the third image interpolating method, when a direction connecting the first original pixel and the second original pixel is defined as an up-and-down direction, and a direction perpendicular to the up-and-down direction is defined as a right-and-left direction, assuming that the first original pixel is just above the second original pixel, and letting D12 and D24 be respectively the upper opposed pixel and the lower opposed pixel in the set of opposed pixels between which the interpolation pixel is sandwiched diagonally, d12 and d24 be respectively the pixel data on the opposed pixels D12 and D24, β1 and β2 be respectively predetermined factors, Hl be the sum of a horizontal correlation intensity on the side of the one opposed pixel D12 and a horizontal correlation intensity on the side of the other opposed pixel D24, Vl be the sum of a vertical correlation intensity on the side of the one opposed pixel D12 and a vertical correlation intensity on the side of the other opposed pixel D24, and x be the pixel data in the settable range S found in the third step, an equation for calculating a correlation value L corresponding to the set is expressed by the following equation:

$$L=|d12-x|+|d24-x|+\beta 1 \cdot Hl-\beta 2 \cdot Vl \qquad (17)$$

The twelfth image interpolating method according to the present invention is characterized in that in the eleventh image interpolating method, the vertical correlation intensity on the side of the upper opposed pixel D12 is a secondary differential value in the vertical direction corresponding to the opposed pixel, and the vertical correlation intensity on the side of the lower opposed pixel D24 is a secondary differential value in the vertical direction corresponding to the opposed pixel.

The thirteenth image interpolating method according to the present invention is characterized in that in the twelfth image interpolating method, when the sum of a secondary differential value in the horizontal direction corresponding to an original pixel just above a target original pixel, a value which is two times a secondary differential value in the horizontal direction corresponding to the target original pixel, and a secondary differential value in the horizontal direction corresponding to an original pixel just below the target original pixel is defined as a horizontal correlation intensity in a predetermined region centered around the target original pixel, in a case where the upper opposed pixel D12 is the first pixel in the horizontal direction from the first original pixel, and the lower opposed pixel D24 is the first pixel in the horizontal direction from the second original pixel, the horizontal correlation intensity on the side of the upper opposed pixel D12 is a horizontal correlation intensity in a predetermined region centered around the opposed pixel D12, and the horizontal correlation intensity on the side of the lower opposed pixel D24 is a horizontal correlation intensity in a predetermined region centered around the opposed pixel D24.

The fourteenth image interpolating method according to the present invention is characterized in that in the thirteenth image interpolating method, when the upper opposed pixel D12 is the n-th pixel in the horizontal direction from the first original pixel, and the lower opposed pixel D24 is the n-th pixel in the horizontal direction from the second original pixel, the horizontal correlation intensity on the side of the upper opposed pixel D12 is a value obtained by adding the sum of horizontal correlation intensities in predetermined regions centered around the original pixels between the first original pixel and the opposed pixel D12 to the horizontal correlation intensity in the predetermined region centered around the opposed pixel D12, and the horizontal correlation intensity on the side of the lower opposed pixel D24 is a value obtained by adding the sum of horizontal correlation intensities in predetermined regions centered around the original pixels between the second original pixel and the opposed pixel D24 to the horizontal correlation intensity in the predetermined region centered around the opposed pixel D24.

The fifteenth image interpolating method according to the present invention is characterized in that in the first to fourteenth image interpolating methods, the fourth step comprises the steps of selecting the minimum of the minimum correlation values found for the sets in the third step, extracting the pixel data on the interpolation pixel in a case where the selected minimum of the minimum correlation values is given, determining, when the number of minimums of the minimum correlation values is one, the pixel data on the interpolation pixel in a case where the minimum of the minimum correlation values is given as the temporary pixel data on the interpolation pixel, and determining, when there are a plurality of minimums of the minimum correlation values, the average of the pixel data on the interpolation pixel in cases where the minimums of the minimum correlation values are respectively given as the temporary pixel data on the interpolation pixel.

The sixteenth image interpolating method according to the present invention is characterized in that in the first to fourteenth image interpolating methods, the fourth step comprises the steps of selecting the minimum of the minimum correlation values found for the sets in the third step, extracting the pixel data on the interpolation pixel in a case where the selected minimum of the minimum correlation values is given, determining, when the number of minimums of the minimum correlation values is one, the pixel data on the interpolation pixel in a case where the minimum of the minimum correlation values is given as the temporary pixel data on the interpolation pixel, and extracting, when there are a plurality of minimums of the minimum correlation values, the maximum and the minimum of the pixel data on the interpolation pixel in cases where the minimums of the minimum correlation values are respectively given, and determining the average of the extracted maximum and minimum as the pixel data on the interpolation pixel.

The seventeenth image interpolating method according to the present invention is characterized in that in the first to fourteenth image interpolating methods, the fourth step comprises the steps of selecting the minimum of the minimum correlation values found for the sets in the third step, extracting the pixel data on the interpolation pixel in a case where the selected minimum of the minimum correlation values is given, determining, when the number of minimums of the minimum correlation values is one, the pixel data on the interpolation pixel in a case where the minimum of the minimum correlation values is given as the temporary pixel data on the interpolation pixel, and selecting, when there are a plurality of minimums of the minimum correlation values, the pixel data obtained from the opposed pixel in closest proximity to the interpolation pixel out of the pixel data on the interpolation pixel in cases where the minimums of the minimum correlation values are respectively given, and determining, when the number of selected pixel data is one, the pixel data as the pixel data on the interpolation pixel, while determining, when the number of selected pixel data is two, the average of the pixel data as the pixel data on the interpolation pixel.

The eighteenth image interpolating method according to the present invention is characterized in that in the first to seventeenth image interpolating methods, the sixth step is one of selecting, when the linear correlation value calculated in the fifth step is not more than the minimum correlation value found in the third step, the linear interpolation value calculated in the fifth step as final pixel data on the interpolation pixel, while selecting, when the linear correlation value calculated in the fifth step is more than the minimum correlation value found in the third step, the temporary pixel data calculated in the fourth step as final pixel data on the interpolation pixel.

The nineteenth image interpolating method according to the present invention is characterized in that in the first to seventeenth image interpolating methods, the sixth step is one of weighting and adding the linear interpolation value calculated in the fifth step and the temporary pixel data calculated in the fourth step depending on the linear correlation value calculated in the fifth step and the minimum correlation value found in the third step, to calculate the final pixel data on the interpolation pixel.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Referring now to FIGS. 1, 5, 6, 7 to 15, embodiments of the present invention will be described.

[1] Description of First Embodiment

An image interpolating method according to a first embodiment of the present invention (hereinafter referred to as a first proposed method) will be described.

Figure 1:
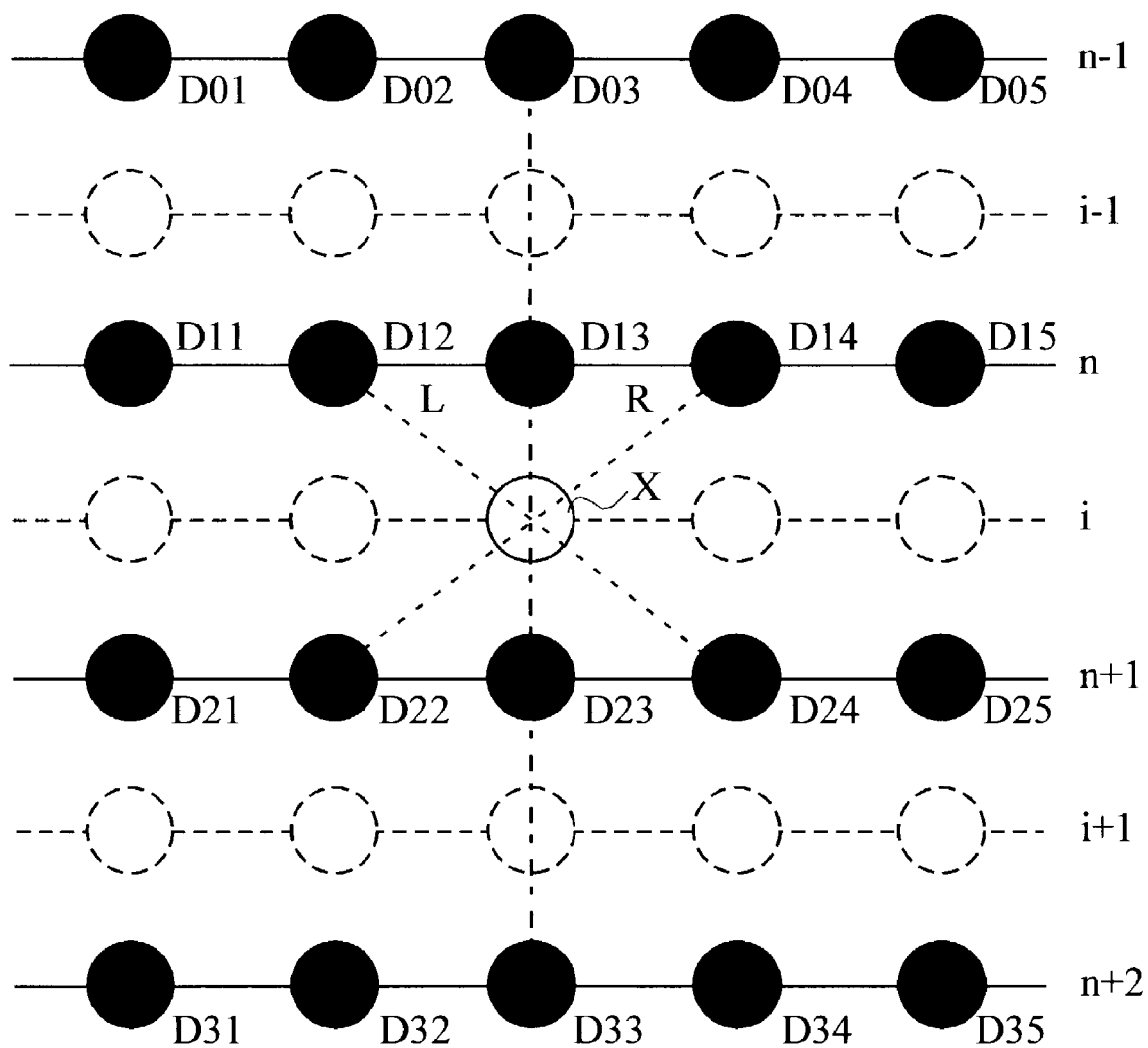
FIG. 1 is a schematic view showing the relationship between original pixels and an interpolation pixel.

[1-1] Description of Relationship Between Original Pixels and Pixel to be Interpolated FIG. 1 illustrates the relationship between original pixels and a pixel to be interpolated.

In FIG. 1, lines (n−1), n, (n+1), and (n+2) are horizontal lines in an original image, and lines (i−1), i, (i+1) are horizontal lines to be interpolated. Description is herein made of a case where a pixel (hereinafter referred to as an interpolation pixel) X on the line i is interpolated.

In the following description, pixel data on original pixels D01 to D35 and the interpolation pixel X are respectively denoted by d01 to d35 and x. In this example, the pixel data shall be composed of eight bits, and black data and white data shall be respectively "0" and "255".

Figure 7:
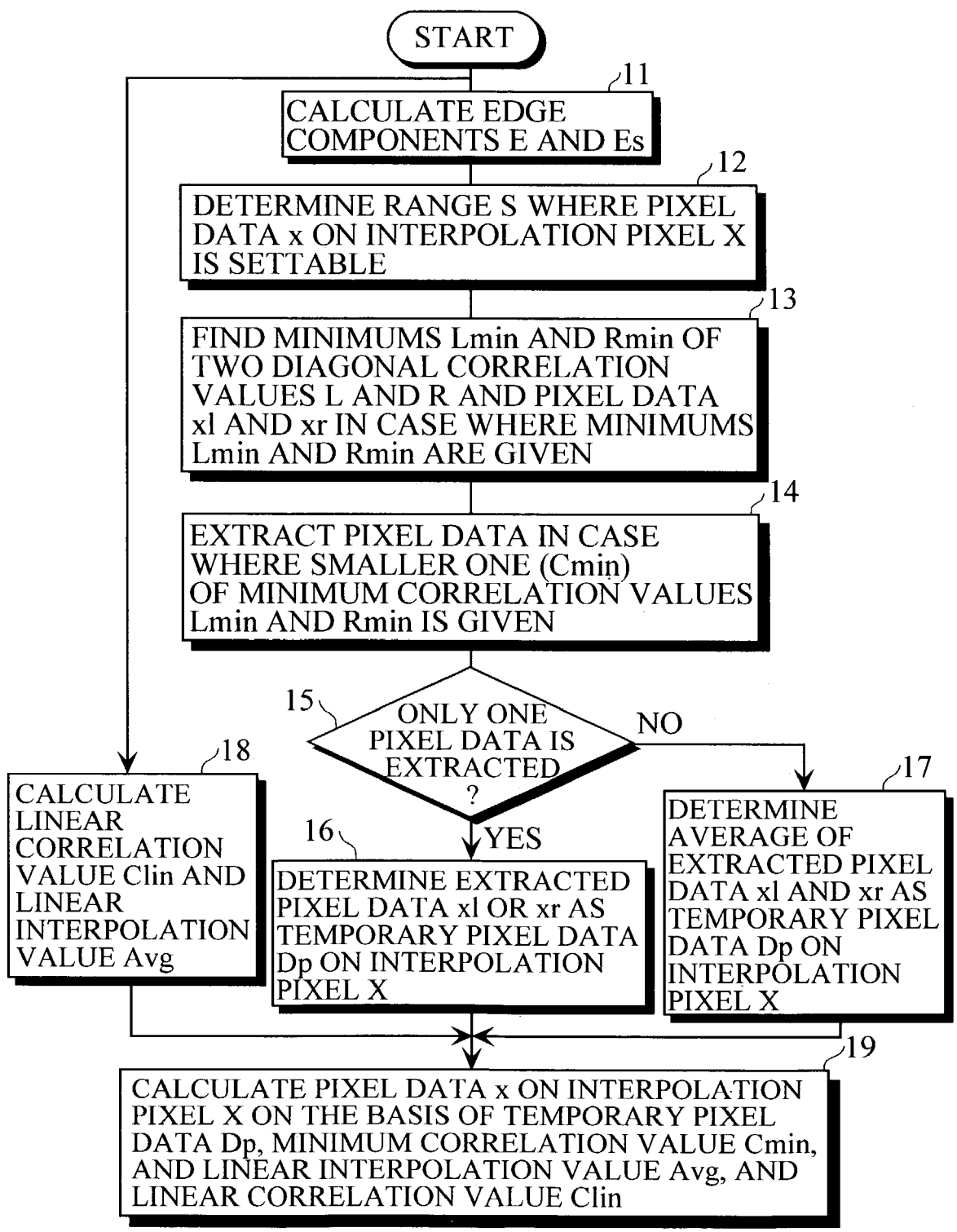
FIG. 7 is a flow chart showing the procedure for finding pixel data x on an interpolation pixel X by a first proposed method.

[1-2] Description of Procedure for Finding Pixel Data x on Interpolation Pixel X FIG. 7 shows the procedure for finding the pixel data x on the interpolation pixel X by the first proposed method.

[1-2-1] Description of Step 11

In order to judge whether or not the interpolation pixel X exists in the vicinity of an edge of the original image, a first edge component E and a second edge component Es are first calculated (step 11). That is, the pixel data on the two original pixels D03 and D13 just above the interpolation pixel X and the pixel data on the original pixels D23 and D33 just below the interpolation pixel X are used, to find the first edge component E from the following equation (18) as well as to find the second edge component Es from the following equation (19):

$$E = -d03 + d13 + d23 - d33 \quad (18)$$

$$Es = |d03 + d13 - d23 - d33| \quad (19)$$

The first edge component E takes a relatively large negative value when the interpolation pixel X exists in the vicinity of a black edge of the original image, while taking a relatively large positive value when the interpolation pixel X exists in the vicinity of a white edge of the original image. On the other hand, the second edge component Es takes a relatively large value when the interpolation pixel X exists in the vicinity of an edge (an edge at a boundary between white and black) of the original image, while taking a relatively small value when the interpolation pixel X does not exist in the vicinity of the edge of the original image.

[1-2-2] Description of Step 12

A range S where the pixel data x on the interpolation pixel X is settable is then determined on the basis of the edge components E and Es (step 12).

Figure 8A:
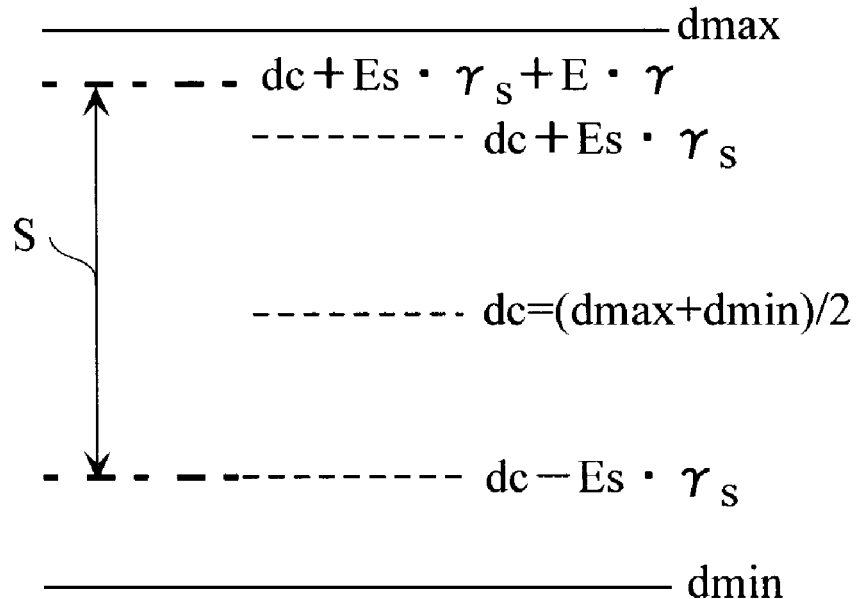
FIGS. 8a and 8b are schematic views showing a range S where pixel data x on an interpolation pixel X is settable.
Figure 8B:
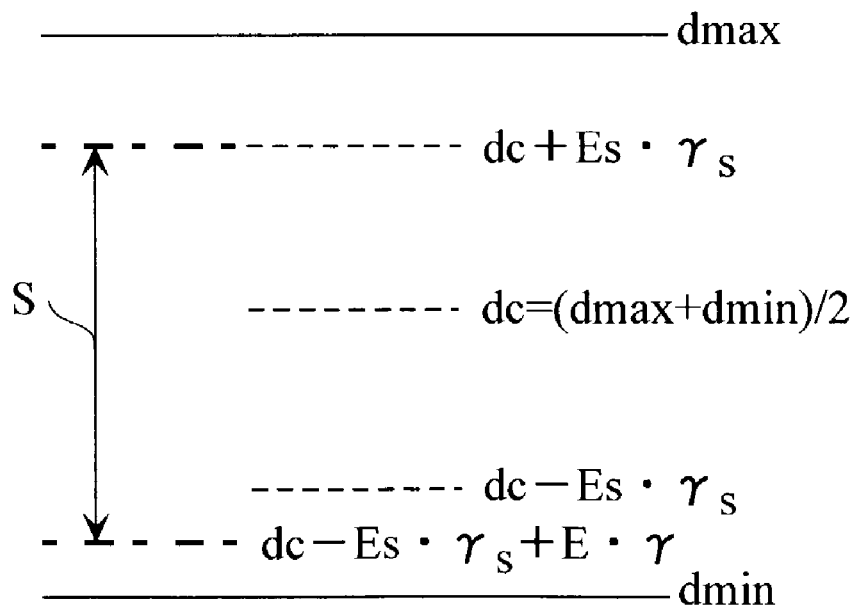

Description is made of a method of determining the settable range S on the basis of FIGS. 8a and 8b. In FIGS. 8a and 8b, $d_{max}$ denotes the larger one of the pixel data d13 and d23 on the original pixels D13 and D23, and $d_{min}$ denotes the smaller one of the pixel data d13 and d23. Further, dc denotes the average $(d_{max}+d_{min})/2$ of $d_{max}$ and $d_{min}$.

(1) Range S Where Pixel Data x is Settable When $E \geq 0$

When $E \geq 0$, the range S where the pixel data x is settable shall be a range of $dc-(Es \times \gamma s) \leq S \leq dc+(Es \times \gamma s)+(E \times \gamma)$ as shown in FIG. 8a, where γ s and γ are variables which can be controlled from the exterior.

That is, when the edge component E is not less than zero, the range S where the pixel data x is settable is a range expanded upward by the value of γ·E from a range $[dc-(Es \times \gamma s) \leq x \leq dc+(Es \times \gamma s)]$ centered around dc.

In this case, it is presumed that the interpolation pixel X exists in the vicinity of the white edge of the original image, and the settable range S is set to a range near $d_{max}$ in the range of $d_{min}$ to $d_{max}$.

(2) Range S where Pixel Data x is Settable When E<0

When E<0, the settable range S shall be a range of $dc-(Es \times \gamma s)+(E \times \gamma) \leq S \leq dc+(Es \times \gamma s)$, as shown in FIG. 8b.

That is, when the edge component E is less than zero, the range S where the pixel data x is settable is a range expanded downward by the value of γ·E from a range $[dc-(Es \times \gamma s) \leq x \leq dc+(Es \times \gamma s)]$ centered around dc.

In this case, it is presumed that the interpolation pixel X exists in the vicinity of the black edge of the original image, and the settable range S is set to a range near $d_{min}$ in the range of $d_{min}$ to $d_{max}$.

[1-2-3] Description of Step 13

Candidates for the pixel data x on the interpolation pixel X are then found from the range S where the pixel data x on the interpolation pixel X is settable on the basis of the pixel data on the opposed pixels between which the interpolation pixel X is sandwiched diagonally (step 13).

Figure 2:
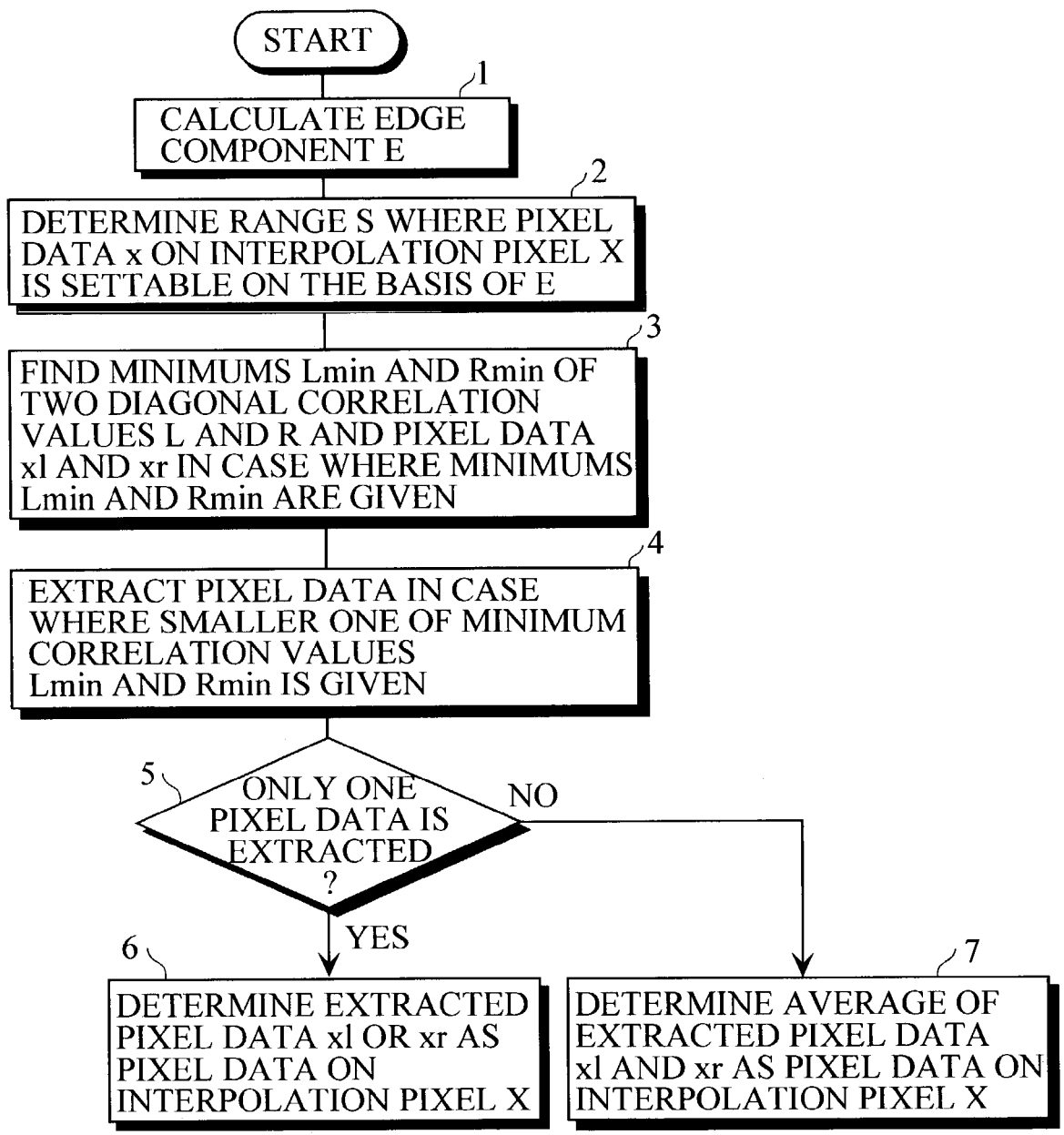
FIG. 2 is a flow chart showing the procedure for finding pixel data x on an interpolation pixel X by a conventional method.
Figure 3A:
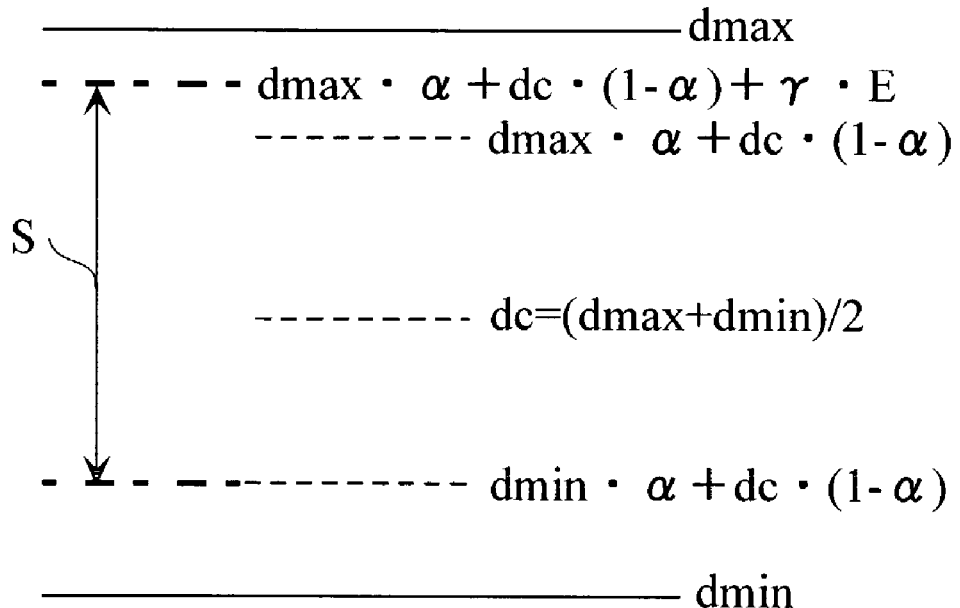
FIGS. 3a and 3b are schematic views showing a range S where pixel data x on an interpolation pixel X is settable.
Figure 3B:
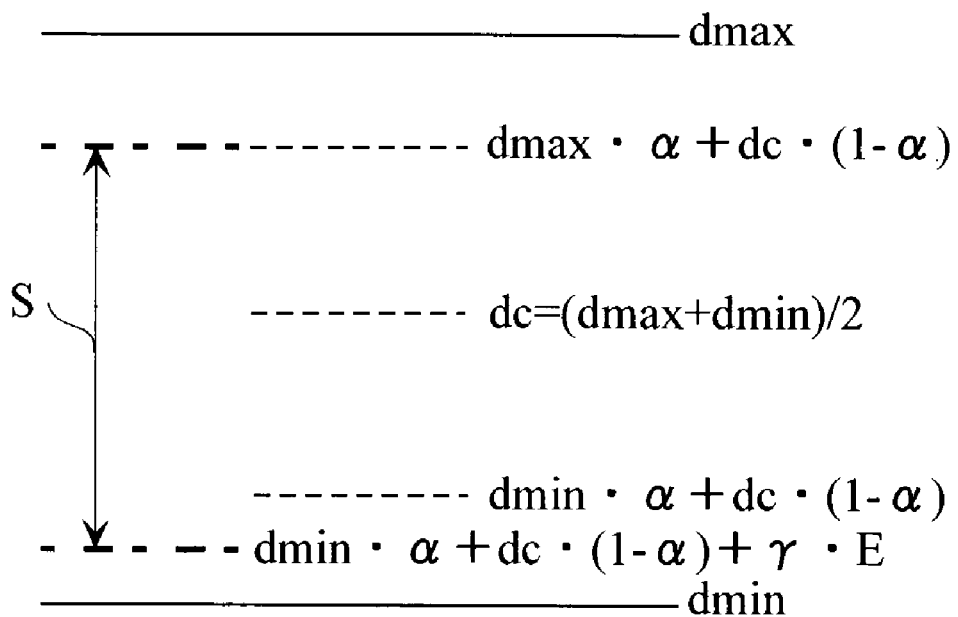
Figure 4:
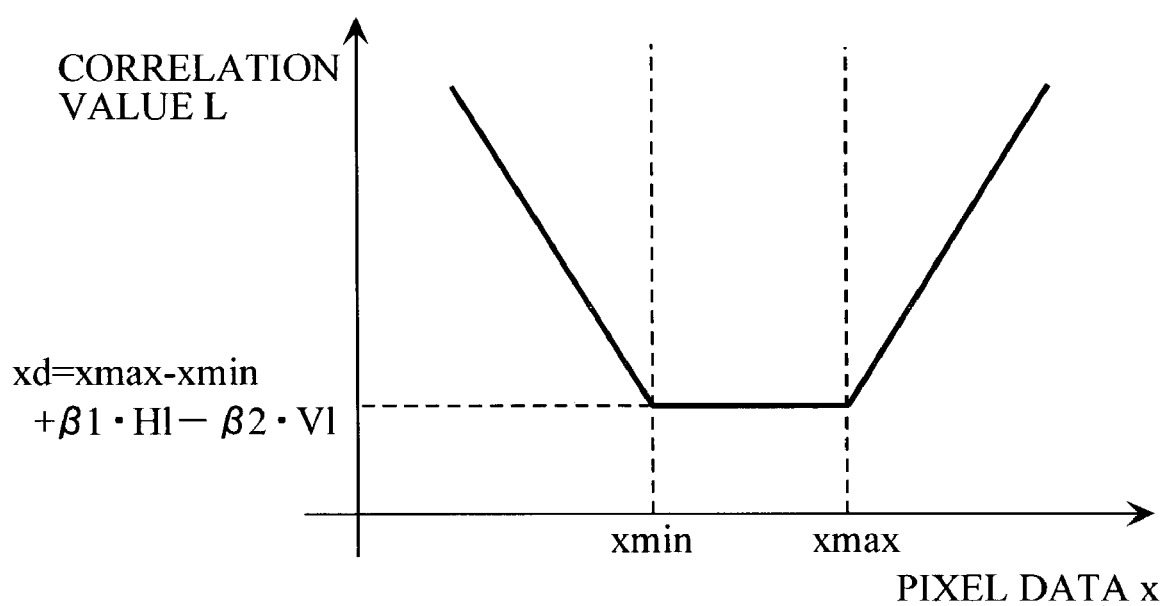
FIG. 4 is a graph of a correlation value L against pixel data x.
Figure 5A:
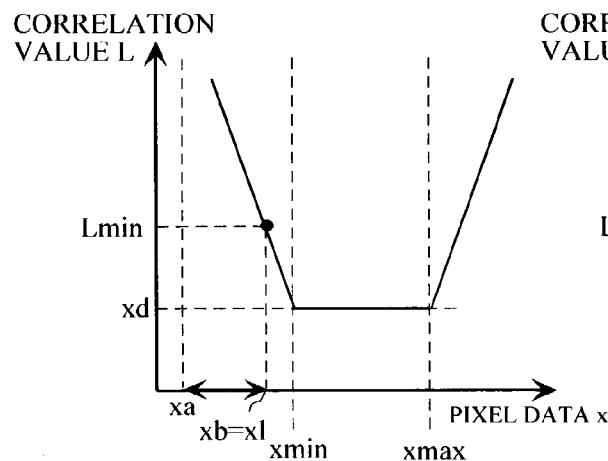
FIGS. 5a to 5f are graphs of a correlation value L against pixel data x and schematic views showing a range S where the pixel data x is settable.
Figure 5B:
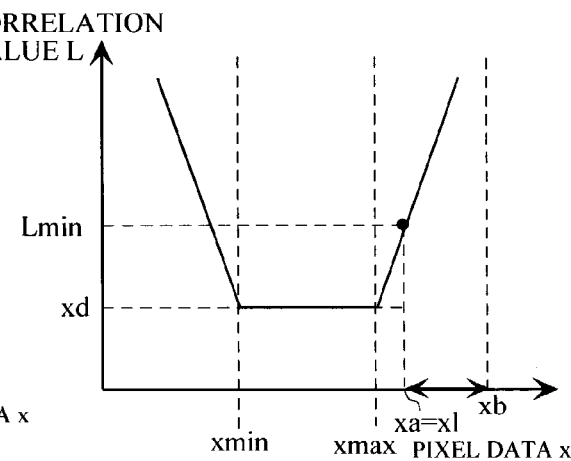
Figure 5C:
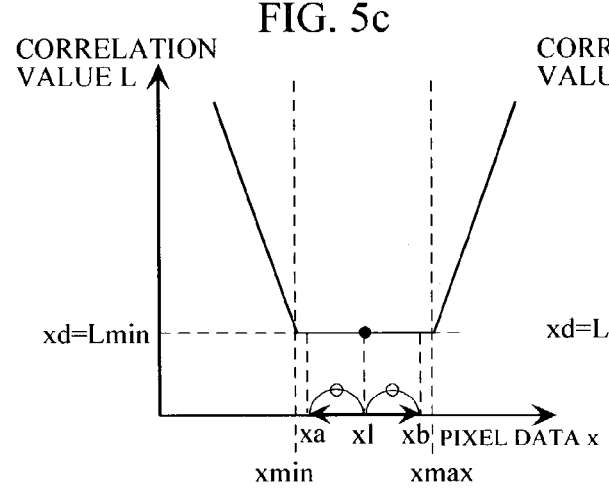
Figure 5D:
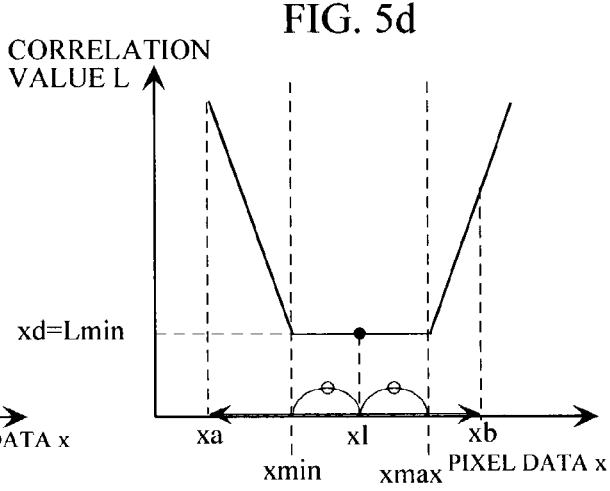
Figure 5E:
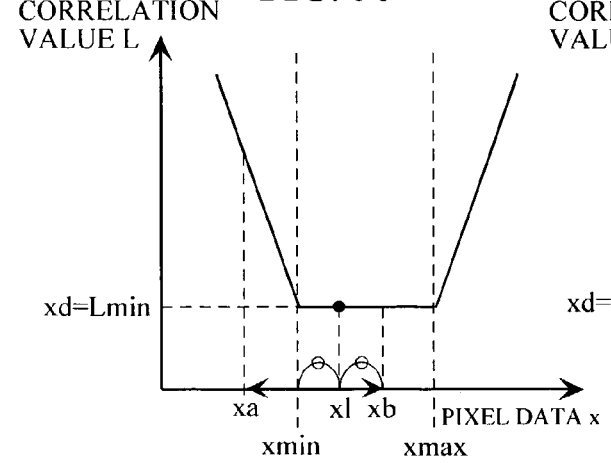
Figure 5F:
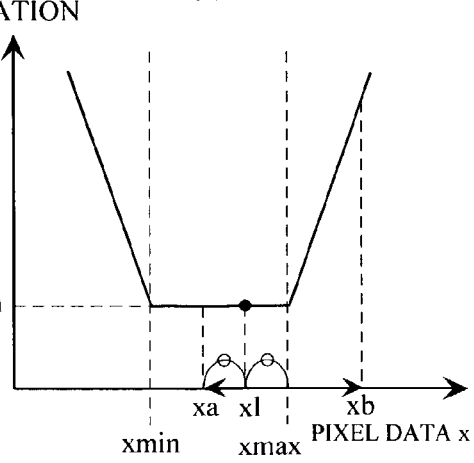

Although a method of finding the candidates for the pixel data x on the interpolation pixel X is approximately the same as that in the step 3 shown in FIG. 2, methods of respectively calculating correlation values L and R differ from those in the step 3 shown in FIG. 2.

A correlation value L between the pixel data on the opposed pixels D12 and D24 and the pixel data x on the interpolation pixel X shown in FIG. 1 is expressed by the following equation (20), and a correlation value R between the pixel data on the opposed pixels D14 and D22 and the pixel data x on the interpolation pixel X shown in FIG. 1 is expressed by the following equation (21):

$$L = |d12 - x| + |d24 - x| + \beta 1 \times Hl - \beta 2 \times Vl \quad (20)$$

$$R = |d14 - x| + |d22 - x| + \beta 1 \times Hr - \beta 2 \times Vr \quad (21)$$

In the foregoing equations (20) and (21), β1 and β2 are valuables which can be controlled from the exterior. Although the foregoing equations (20) and (21) are the same as the foregoing equations (2) and (3) in the conventional method, methods of respectively calculating horizontal correlation intensities Hl and Hr differ from those in the conventional example.

Description is herein made of the basic ideas of the methods of respectively calculating Hl and Hr. Since the basic ideas of the methods of respectively calculating Hl and Hr are the same, description is herein made of the basic idea of the method of calculating Hl.

Hl is defined as the larger one of a horizontal correlation intensity on the side of the upper opposed pixel (D12 shown in FIG. 1 in this example) and a horizontal correlation intensity on the side of the lower opposed pixel (D24 shown in FIG. 1 in this example).

The sum of a primary differential value in the horizontal direction corresponding to an original pixel just above a target original pixel, a value which is two times a primary differential value in the horizontal direction corresponding to the target original pixel, and a primary differential value in the horizontal direction corresponding to an original pixel just below the target original pixel is defined as a horizontal correlation intensity in a predetermined region (a region of 3 pixels by 3 pixels) centered around the target original pixel.

Suppose a pixel just above the interpolation pixel X is a first original pixel, and a pixel just below the interpolation pixel X is a second original pixel. In this case, when the upper opposed pixel is the first pixel in the horizontal direction from the first original pixel, and the lower opposed pixel is the first pixel in the horizontal direction from the second original pixel, the horizontal correlation intensity on the side of the upper opposed pixel is a horizontal correlation intensity in a predetermined region centered around the opposed pixel, and the horizontal correlation intensity on the side of the lower opposed pixel is a horizontal correlation intensity in a predetermined region centered around the opposed pixel.

When the upper opposed pixel is the n-th pixel in the horizontal direction from the first original pixel, and the lower opposed pixel is the n-th pixel in the horizontal direction from the second original pixel, the horizontal correlation intensity on the side of the upper opposed pixel is a value obtained by adding the sum of horizontal correlation intensities in predetermined regions centered around the original pixels between the first original pixel and the opposed pixel to the horizontal correlation intensity in the predetermined region centered around the opposed pixel. The horizontal correlation intensity on the side of the lower opposed pixel is a value obtained by adding the sum of horizontal correlation intensities in predetermined regions centered around the original pixels between the second original pixel and the opposed pixel to the horizontal correlation intensity in the predetermined region centered around the opposed pixel.

Consequently, the horizontal correlation intensity Hl in the foregoing equation (20) is expressed by the following equation (22), letting AL1 be a horizontal correlation intensity in the predetermined region centered around the upper opposed pixel D12 and letting BL1 be a horizontal correlation intensity in the predetermined region centered around the lower opposed pixel D24:

$$Hl = \text{MAX}[AL1, BL1] = \text{MAX}[\{(|d03-d02|+|d02-d01|)+2(|d13-d12|+|d12-d11|)+(|d23-d22|+|d22-d21|)\}, \{(|d13-d14|+|d14-d15|)+2(|d23-d24|+|d24-d25|)+(|d33-d34|+|d34-d35|)\}] \quad (22)$$

That is, the horizontal correlation intensity on the side of the upper opposed pixel D12 is equal to the horizontal correlation intensity AL1 in the predetermined region centered around the upper opposed pixel D12, and is represented by the sum of a primary differential value (|d03−d02|+|d02−d01|) in the horizontal direction corresponding to the pixel D02 just above the opposed pixel D12, a value which is two times a primary differential value (|d13−d12|+|d12−d11|) in the horizontal direction corresponding to the opposed pixel D12, and a primary differential value (|d23−d22|+|d22−d21|) in the horizontal direction corresponding to the pixel D22 just below the opposed pixel D12.

The horizontal correlation intensity on the side of the lower opposed pixel D24 is equal to the horizontal correlation intensity BL1 in the predetermined region centered around the lower opposed pixel D24, and is represented by the sum of a primary differential value (|d13−d14|+|d14−d15|) in the horizontal direction corresponding to the pixel D14 just above the opposed pixel d24, a value which is two times a primary differential value (|d23−d24|+|d24−d25|) in the horizontal direction corresponding to the opposed pixel D24, and a primary differential value (|d33−d34|+|d34−d35|) in the horizontal direction corresponding to the pixel D34 just below the opposed pixel D24.

A vertical correlation intensity Vl is defined as the smaller one of a vertical correlation intensity on the side of the upper opposed pixel and a vertical correlation intensity on the side of the lower opposed pixel. The vertical correlation intensity on the side of the upper opposed pixel is a primary differential value in the vertical direction corresponding to the opposed pixel, and the vertical correlation intensity on the side of the lower opposed pixel is a primary differential value in the vertical direction corresponding to the opposed pixel. Consequently, the vertical correlation intensity Vl is expressed by the following equation (23):

$$Vl = \text{MIN}(|d02-d12|+|d12-d22|, |d14-d24|+|d24-d34|) \quad (23)$$

That is, the vertical correlation intensity on the side of the upper opposed pixel D12 is represented as a primary differential value (|d02−d12|+|d12−d22|) in the vertical direction corresponding to the pixel D12, and the vertical correlation intensity on the side of the lower opposed pixel D24 is represented as a primary differential value (|d14−d24|+|d24−d34|) in the vertical direction corresponding to the pixel D24.

The vertical correlation intensity on the side of the upper opposed pixel may be a secondary differential value in the vertical direction corresponding to the opposed pixel, and the vertical correlation intensity on the side of the lower opposed pixel may be a secondary differential value in the vertical direction corresponding to the opposed pixel. In this case, the vertical correlation intensity Vl is expressed by the following equation (24):

$$Vl = \text{MIN}(|-d02+2*d12-d22|, |-d14+2*d24-d34|) \quad (24)$$

The horizontal correlation intensity Hr in the foregoing equation (21) is expressed by the following equation (25), letting AR1 be a horizontal correlation intensity in the predetermined region centered around the upper opposed pixel D14 and letting BR1 be a horizontal correlation intensity in the predetermined region centered around the lower opposed pixel D22. Further, the vertical correlation intensity Vr is expressed by the following equation (26):

$$Hr = \text{MAX}[AR1, BR1] = \text{MAX}[\{(|d03-d04|+|d04-d05|)+2(|d13-d14|+|d14-d15|)+(|d23-d24|+|d24-d25|)\}, \{(|d13-d12|+|d12-d11|)+2(|d23-d22|+|d22-d21|)+(|d33-d32|+|d32-d31|)\}] \quad (25)$$

$$Vr = \text{MIN}(|d04-d14|+|d14-d24|, |d12-d22|+|d22-d32|) \quad (26)$$

The vertical correlation intensity Vr may be calculated by the following equation (27):

$$Vr = \text{MIN}(|d04+2*d14-d24|, |-d12+2*d22-d32|) \quad (27)$$

Figure 9:
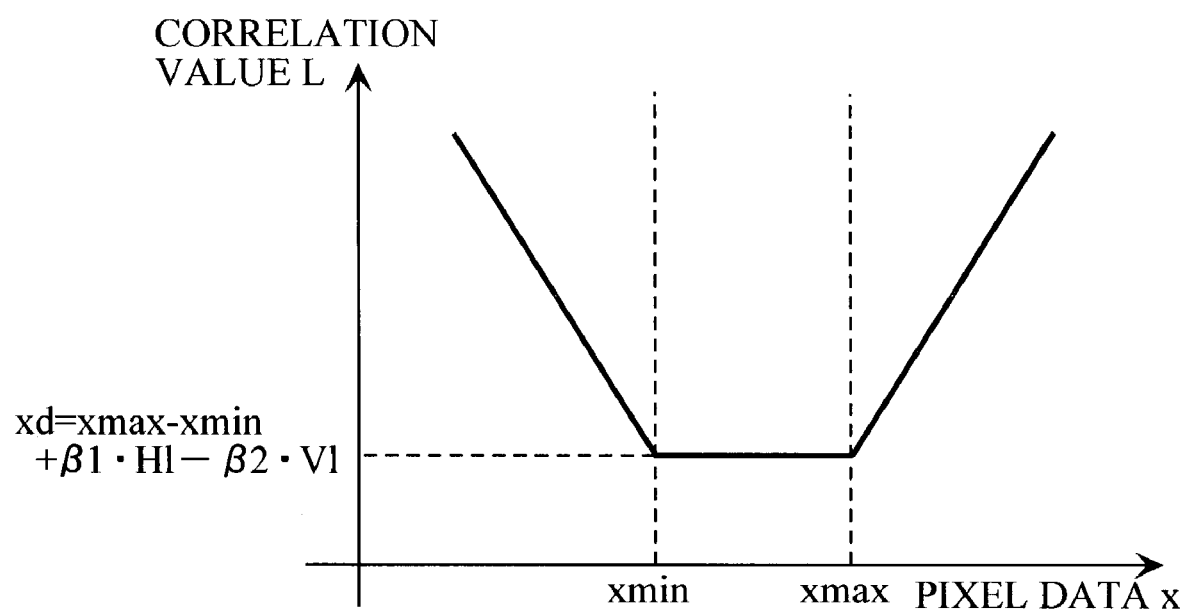
FIG. 9 is a graph of a correlation value L against pixel data x.

FIG. 9 illustrates the relationship between the correlation value L and the pixel data x. In FIG. 9, $x_{min}$ denotes the smaller one of the pixel data d12 and d24, and $x_{max}$ denotes the larger one of the pixel data d12 and d24. Further, $xd = x_{max} - x_{min} + \beta 1 \times Hl - \beta 2 \times Vl$.

When $xd = x_{max} - x_{min} + \beta 1 \times Hl - \beta 2 \times Vl$, the correlation value L in the foregoing equation (20) can be changed, as expressed by the following equation (28) The correlation value R in the foregoing equation (21) can be also similarly changed:

$$L = xd + 2(x - x_{\max}) \quad (x > x_{\max}) \quad (28)$$
$$L = xd \quad (x_{\min} \leq x \leq x_{\max})$$
$$L = xd + 2(x_{\min} - x) \quad (x < x_{\min})$$

The minimum correlation values $L_{min}$ and $R_{min}$ and the pixel data xl and xr can be found by the second method described in the step 3 shown in FIG. 2, that is, the same method as that described using FIG. 5.

[1-2-4] Description of Steps 14 to 17

When the minimum correlation values $L_{min}$ and $R_{min}$ and the pixel data xl and xr in cases where the minimum correlation values are respectively given are found in the step 13, pixel data in a case where the smaller one of the minimum correlation values $L_{min}$ and $R_{min}$ (a diagonal minimum correlation value Cmin) is given is extracted (step 14).

When the minimum correlation values $L_{min}$ and $R_{min}$ differ from each other, one pixel data is extracted. When both the minimum correlation values $L_{min}$ and $R_{min}$ are the same, two pixel data are extracted.

When one pixel data xl or xr is extracted in the step 14 (YES in step 15), the extracted pixel data is determined as temporary pixel data Dp on the interpolation pixel X (step 16). The program then proceeds to the step 19. When two (a plurality of) pixel data xl and xr are selected in the step 14 (NO in step 15), the average of the pixel data xl and xr is determined as temporary pixel data Dp on the interpolation pixel X (step 17). The program then proceeds to the step 19.

The details are as follows:

① if $L_{min} < R_{min}$, then Dp=xl
② if $L_{min} > R_{min}$, then Dp=xr
③ if $L_{min} = R_{min}$, then Dp=(xl+xr)/2

[1-2-5] Description of Step 18

On the other hand, in the step 18, a linear correlation value Clin (Clin=|d13−d23|) and a linear interpolation value Avg (Avg=(d13+d23)/2) using the pixel data d13 and d23 on the pixels D13 and D23 above and below the interpolation pixel X are calculated.

[1-2-6] Description of Step 19

In the step 19, the final pixel data x on the interpolation pixel X is calculated on the basis of the temporary pixel data Dp on the interpolation pixel X obtained in the step 16 or 17, the diagonal minimum correlation value Cmin obtained in the step 14, and the linear interpolation value Avg and the linear correlation value Clin, which correspond to the interpolation pixel X, obtained in the step 18.

That is, when the linear correlation value Clin is not more than the diagonal minimum correlation value Cmin, the linear interpolation value Avg is taken as the final pixel data x on the interpolation pixel X. When the linear correlation value Clin is more than the diagonal minimum correlation value Cmin, the temporary pixel data Dp is taken as the final pixel data x on the interpolation pixel X.

Furthermore, the final pixel data x may be also calculated on the basis of the following equation (29).

$$x = Dp \times K + Avg \times (1-K)$$

$$K = Clin/(Clin+Cmin)$$

where K=1 when Cmin<0 or Clin=Cmin=0

K=0 when Cmin>Th  (29)

Th is set to 255, for example, when the pixel data is composed of eight bits.

Figure 6:
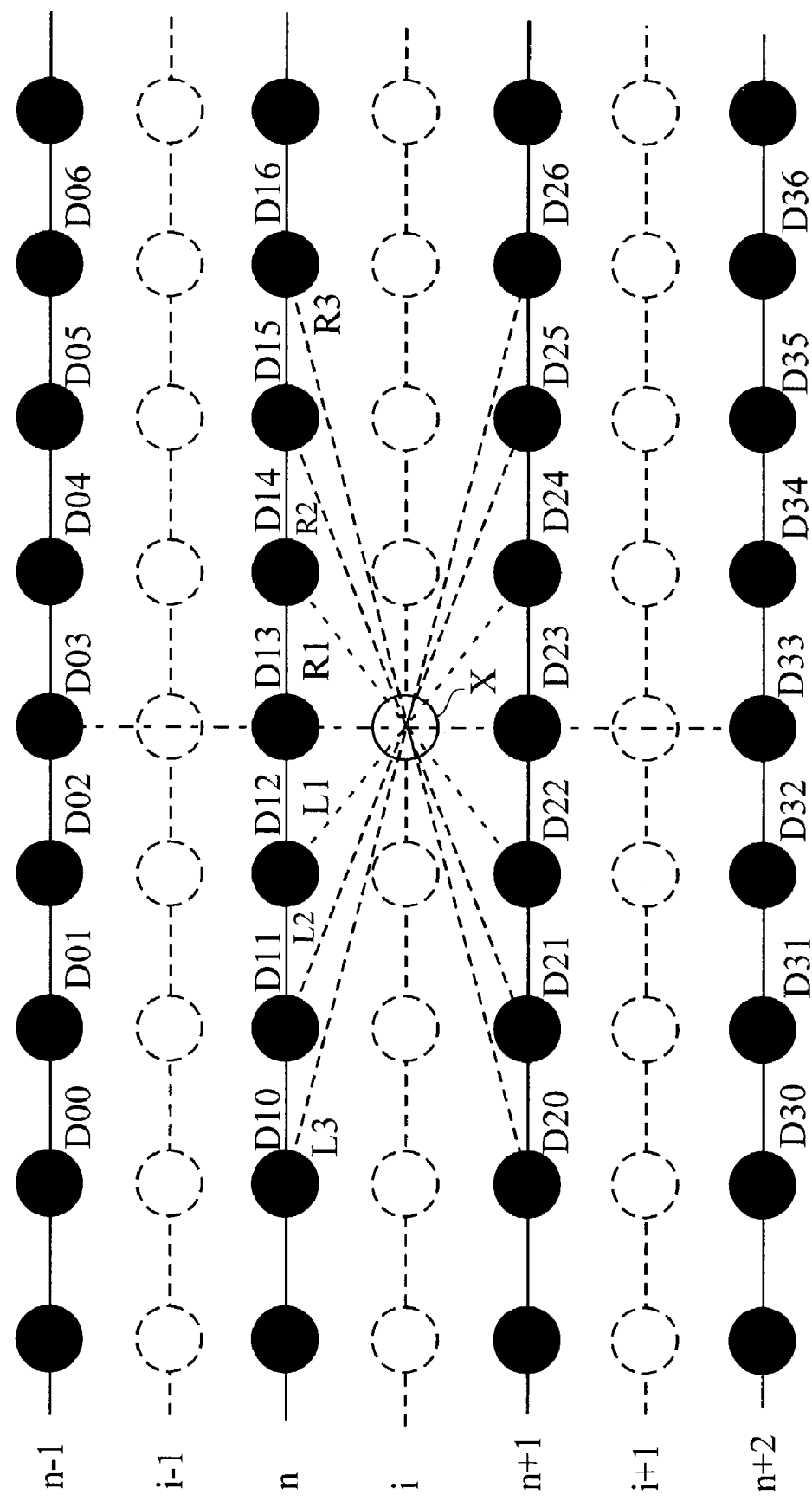
FIG. 6 is a schematic view showing the relationship between original pixels and an interpolation pixel.

[1-3] Description of Case Where Number of Types of Diagonal Correlation is Increased Although two sets are selected as the set of opposed pixels between which the interpolation pixel X is sandwiched diagonally in the foregoing step 13, two or more sets may be selected. For example, six sets of opposed pixels, for example, D12 and D28, D13 and D27, D14 and D26, D16 and D24, D17 and D23, and D18 and D22 may be selected, as shown in FIG. 6. In this case, pixel data in a case where the minimum of the correlation value is given is found in the step 13 for each of the sets of opposed pixels. That is, six candidates for the pixel data are found.

When the number of the minimums of the minimum correlation values corresponding to the six sets of opposed pixels is three or more, three or more pixel data are extracted from the six candidates for the pixel data in the step 14.

When three or more pixel data are selected in the step 14, there are three methods, as described in the conventional method, as a method of determining the temporary pixel data Dp on the interpolation pixel X.

When six sets of opposed pixels are selected, as shown in FIG. 6, as the set of opposed pixels between which the interpolation pixel X is sandwiched diagonally, the correlation values L2 and R2, for example, are respectively expressed by the following equations (30) and (31):

$$L2 = |d11-x| + |d25-x| + \beta1 \times Hl_2 - \beta2 \times Vl_2 \quad (30)$$

$$R2 = |d15-x| + |d21-x| + \beta1 \times Hr_2 - \beta2 \times Vr_2 \quad (31)$$

Letting AL1 be a horizontal correlation intensity in a predetermined region centered around the pixel D12, AL2 be a horizontal correlation intensity in a predetermined region centered around the pixel D11, BL1 be a horizontal correlation intensity in a predetermined region centered around the pixel D24, and BL2 be a horizontal correlation intensity in a predetermined region centered around the pixel D25, $Hl_2$ in the foregoing equation (30) is expressed by the following equation (32) in accordance with the basic idea of the above-mentioned calculating method. Further, $Vl_2$ is expressed by the following equation (33) when a primary differential value is used:

$$Hl_2 = MAX[AL1+AL2, BL1+BL2] = MAX[\{AL1+(|d02-d01|+|d01-d00|)+2(|d12-d11|+|d11-d10|)+(|d22-d21|+|d21-d20|)\}, \{BL1+(|d14-d15|+|d15-d16|)+2(|d24-d25|+|d25-d26|)+(|d34 \cdot d35|+|d35-d36|)\}] \quad (32)$$

$$Vl_2 = MIN(|d01-d11|+|d11-d21|, |d15-d25|+|d25-d35|) \quad (33)$$

$Hr_2$ in the foregoing equation (31) is expressed by the following equation (34), letting AR1 be a horizontal correlation intensity in a predetermined region centered around the pixel D14, AR2 be a horizontal correlation intensity in a predetermined region centered around the pixel D15, BR1 be a horizontal correlation intensity in a predetermined region centered around the pixel D22, and BR2 be a horizontal correlation intensity in a predetermined region centered around the pixel D21. Further, $Vr_2$ is expressed by the following equation (35) when a primary differential value is used:

$$Hr_2 = MAX[AR1+AR2, BR1+BR2] = MAX[\{AR1+(|d04-d05|+|d05-d06|)+2(|d14-d15|+|d15-d16|)+(|d24-d25|+|d25-d26|)\}, \{BR1+(|d12-d11|+|d11-d10|)+2(|d22-d21|+|d21-d20|)+(|d32-d31|+|d31-d01|)\}] \quad (34)$$

$$Vr_2 = MIN(|d05-d15|+|d15-d25|, |d11-d21|+|d21-d31|) \quad (35)$$

[1-4] Description of Image Interpolating Device Using First Proposed Method

Figure 10:
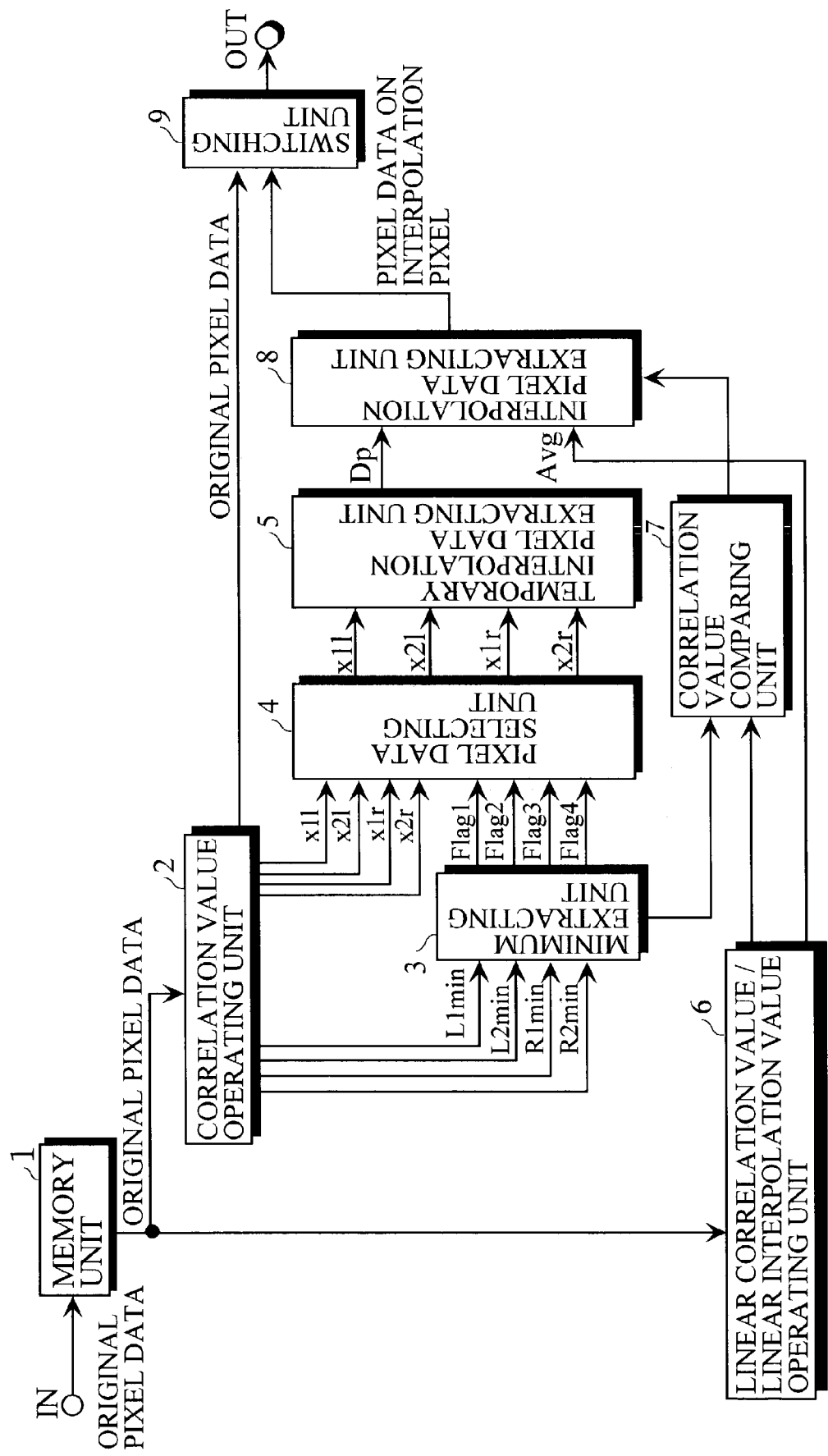
FIG. 10 is a block diagram showing the configuration of an image interpolating device.

FIG. 10 illustrates the configuration of an image interpolating device.

Description is herein made of a case where the number of sets of diagonally opposed pixels is four, and diagonal correlation values L1, L2, R1, and R2 shown in FIG. 6 are calculated.

A memory unit 1 stores pixel data on an original pixel inputted through an input terminal IN. A correlation value operating unit 2 performs the processing in the steps 11 to 13 shown in FIG. 7 using the pixel data on the original pixel stored in the memory unit 1, to calculate four minimum correlation values L1$_{min}$, L2$_{min}$, R1$_{min}$, and R2$_{min}$ which are obtained from four sets of opposed pixels and pixel data x1l, x2l, x1r, and x2r on the interpolation pixel X in cases where the four minimum correlation values are respectively given.

A minimum extracting unit 3 and a pixel data selecting unit 4 perform the processing in the step 14 shown in FIG. 7. The minimum extracting unit 3 identifies the minimum correlation value which is the minimum of the four minimum correlation values L1$_{min}$, L2$_{min}$, R1$_{min}$, and R2$_{min}$ calculated by the correlation value operating unit 2. The minimum extracting unit 3 outputs control signals Flag1 to Flag4 respectively corresponding to the minimum correlation values L1$_{min}$, L2$_{min}$, R1$_{min}$, and R2$_{min}$ of the correlation values L1, L2, R1, and R2. The control signal corresponding to the smallest one of the minimum correlation values L1$_{min}$, L2$_{min}$, R1$_{min}$, and R2$_{min}$ of the correlation values L1, L2, R1, and R2 is considered to be High, and the control signals corresponding to the other minimum correlation values are considered to be Low. The minimum extracting unit 3 gives the minimum correlation value Cmin to a correlation value comparing unit 7.

The pixel data selecting unit 4 selects, out of the four pixel data x1l, x2l, x1r, and x2r which are fed from the correlation value operating unit 2, the pixel data which are candidates for the pixel data x on the interpolation pixel X on the basis of the control signals Flag1 and Flag4 fed from the minimum extracting unit 3. Specifically, the pixel data selecting unit 4 outputs to a temporary interpolation pixel data extracting unit 5 the pixel data corresponding to the control signal, which will be High, out of the control signals fed from the minimum extracting unit 3.

The temporary interpolation pixel data extracting unit 5 performs the processing in the step 16 or 17 shown in FIG. 7 depending on the number of pixel data selected by the pixel data selecting unit 4, to calculate temporary pixel data Dp and feed the calculated temporary pixel data Dp to an interpolation pixel data extracting unit 8.

A linear correlation value/linear interpolation value operating unit 6 performs the processing in the step 18 shown in FIG. 7 using the pixel data on the original pixel stored in the memory unit 1, thereby calculating a linear correlation value Clin and a linear interpolation value Ag. The linear correlation value/linear interpolation value operating unit 6 feeds the obtained linear correlation value Clin to the correlation value comparing unit 7 as well as to feed the obtained linear interpolation value Avg to the interpolation pixel data extracting unit 8.

The correlation value comparing unit 7 compares the diagonal minimum correlation value Cmin given from the minimum extracting unit 3 with the linear correlation value Clin given from the linear correlation value/linear interpolation value operating unit 6, and feeds a signal representing the result of the comparison to the interpolation pixel data extracting unit 8.

The interpolation pixel data extracting unit 8 performs the processing in the step 19 shown in FIG. 7, to select one of the temporary pixel data Dp fed from the temporary interpolation pixel data extracting unit 5 and the linear interpolation value Avg given from the linear correlation value/linear interpolation value operating unit 6 on the basis of the comparison result signal from the correlation value comparing unit 7 and feed the selected one to a switching unit 9.

That is, the interpolation pixel data extracting unit 8 outputs the linear interpolation value Avg when the linear correlation value Clin is not more than the diagonal minimum correlation value Cmin, while outputting the temporary pixel data Dp when the linear correlation value Clin is more than the diagonal minimum correlation value Cmin.

The pixel data on the original pixel is fed to the switching unit 9 through the memory unit 1 and the correlation value operating unit 2. That is, pixel data on original pixels on n lines are outputted to an output unit OUT from the switching unit 9 when the pixel data are outputted, while pixel data on interpolation pixels on i lines are outputted to the output terminal OUT from the switching unit 9 when the pixel data are outputted.

[2] Comparison between First Proposed Method and Conventional Method

[2-1] First Specific Example

Figure 11:
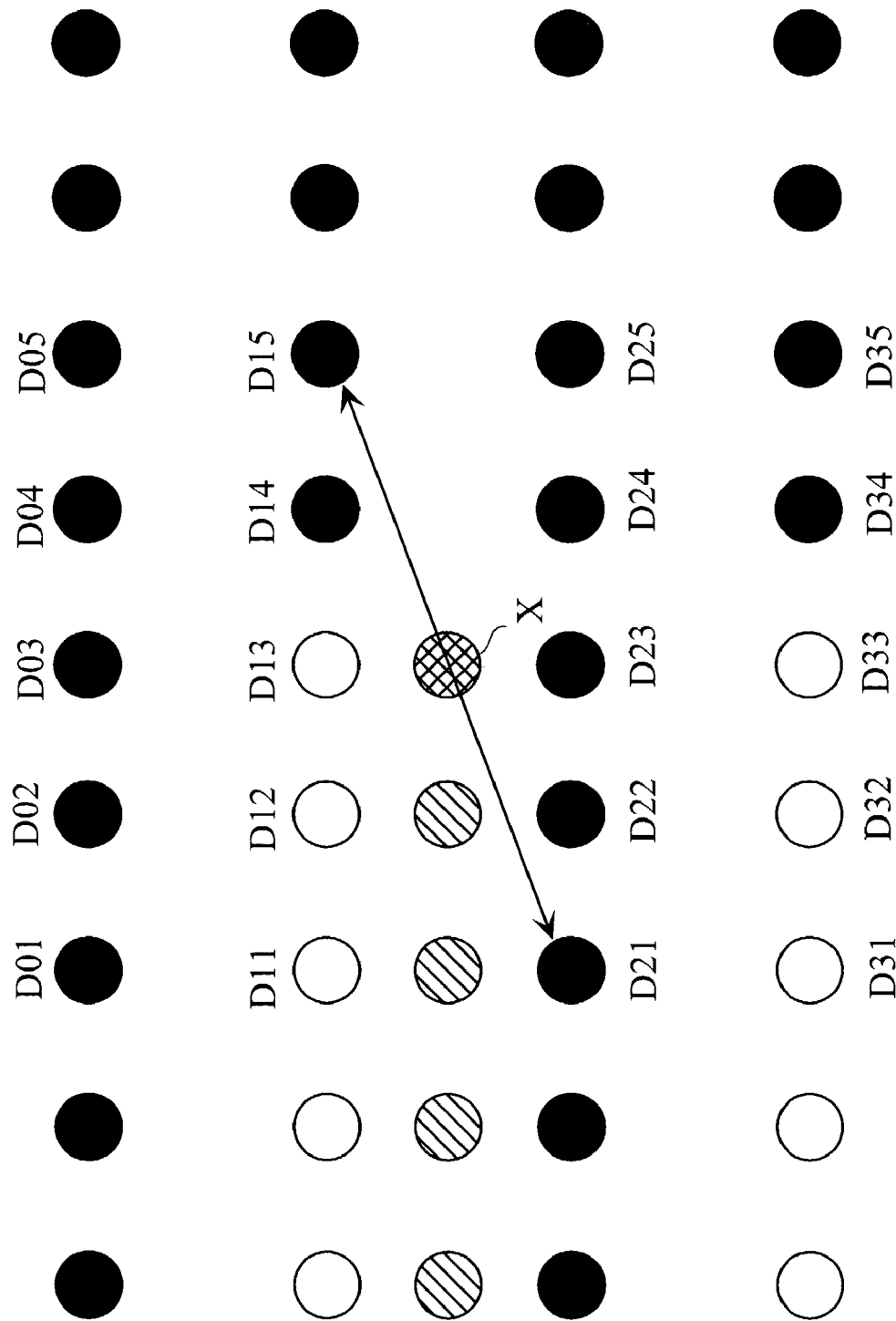
FIG. 11 is a schematic view showing a specific example for comparing a conventional method and a first proposed method.
Figure 12:
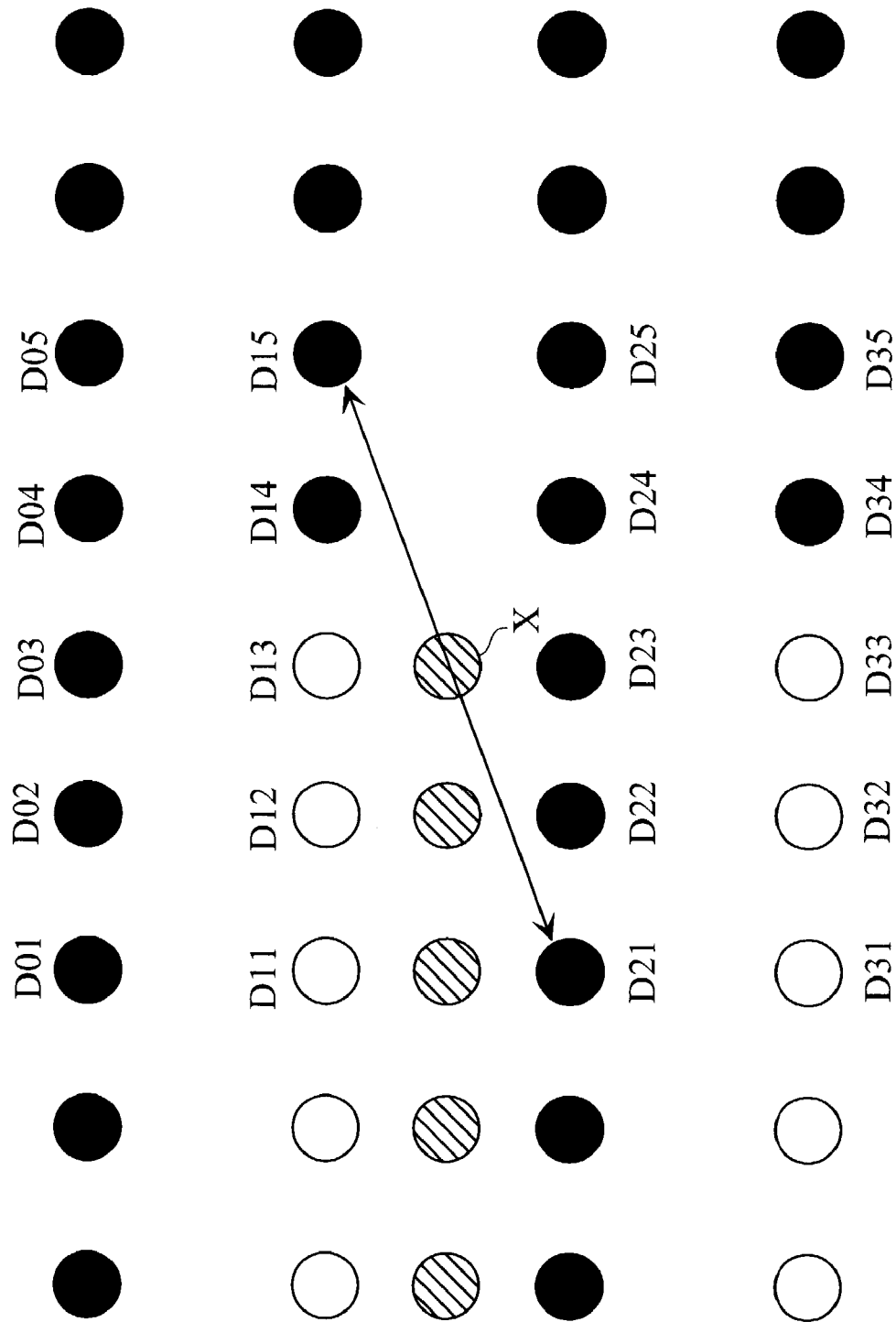
FIG. 12 is a schematic view showing a specific example for comparing a conventional method and a first proposed method.

Suppose a case where the pixel values of the pixels peripheral to the interpolation pixel X are pixel values as shown in FIG. 11. In FIG. 11, a black circle indicates black (a pixel value 0), and a white circle indicates white (a pixel value 1). In the example shown in FIG. 11, the pixel data x on the interpolation pixel X in the conventional method will be compared with that in the first proposed method.

In the conventional method, the edge component E, dmax (the larger one of d13 and d23), $d_{min}$ (the smaller one of d13 and d23), dc (the average of dmax and dmin), the minimum xa in the settable range S, and the maximum xb in the settable range S are as follows:

$$E=-d03+d13+d23-d33=-0+1+0-1=0$$

$$d\mathrm{min}=0,\ d\mathrm{max}=1,\ dc=0.5$$

$$xa=d\mathrm{min}\times\alpha+dc\times(1-\alpha)=0\times\alpha+0.5\times(1-\alpha)=0.5\times(1-\alpha)$$

$$xb = d\mathrm{max}\times\alpha + dc\times(1-\alpha) + E\times\gamma = 1\times\alpha + 0.5\times(1-\alpha) + 0\times\gamma$$
$$= \alpha + 0.5\times(1-\alpha)$$

$$0.25 \leq S \leq 0.75 \text{ when } \alpha=0.5$$

In the case shown in FIG. 11, correlation in a direction indicated by an arrow is strong (a correlation value is the minimum). Consequently, xmin=xmax=0 in FIG. 5. In the case shown in FIG. 11, therefore, the relationship between the correlation value and the pixel data x corresponds to FIG. 5b, so that the pixel data x is xa(0.25).

That is, in the example shown in FIG. 11, the pixel on the left side of the interpolation pixel X takes a linear interpolation value (0.5). However, the pixel data x on the interpolation pixel X is 0.25 close to black, whereby a step occurs in a white line.

Contrary to this, in the first proposed method, the first edge component E, the second edge component Es, dmax, dmin, dc, the minimum xa in the settable range S, and the maximum xb in the settable range S are as follows:

$$E=-d03+d13+d23-d33=-0+1+0-1=0$$

$$Es=|d03+d13-d23-d33|=|0+1-0-1|=0$$

$$d\mathrm{min}=0,\ d\mathrm{max}=1,\ dc=0.5$$

$$xa=dc-Es\times\gamma s=0.5-0\times\gamma s=0.5$$

$$Xb=dc+Es\times\gamma s+E\times\gamma=0.5+0\times\gamma s+0\times\gamma=0.5$$

$$0.5 \leq S \leq =0.5$$

In the case shown in FIG. 11, correlation in a direction indicated by an arrow is strong (a correlation value is the minimum). Consequently, xmin=xmax=0 in FIG. 5. In the case shown in FIG. 11, therefore, the relationship between the correlation value and the pixel data x corresponds to FIG. 5b, so that the pixel data x is xa(0.5).

That is, in the first proposed method, a pixel on the left side of the interpolation pixel X takes a linear correlation value (0.5), and the pixel data x on the interpolation pixel X is also 0.5 by the restriction of the settable range, whereby no step occurs in a white line.

[2-2] Second Specific Example

Figure 13:
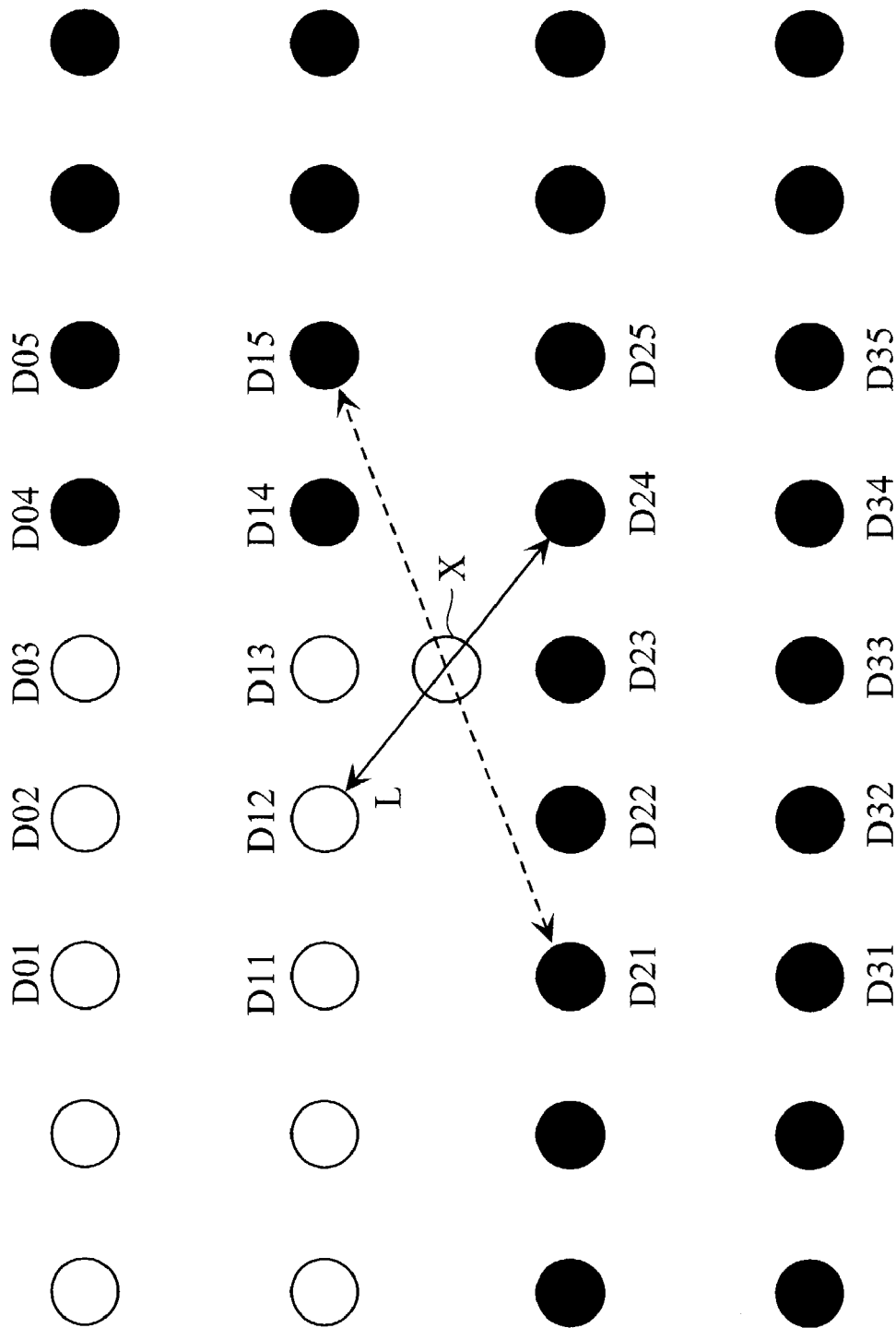
FIG. 13 is a schematic view showing another specific example for comparing a conventional method and a first proposed method.

Suppose a case where the pixel values of the pixels peripheral to the interpolation pixel X are pixel values as shown in FIG. 13. In FIG. 13, a black circle indicates black (a pixel value 0), and a white circle indicates white (a pixel value 1). In the example shown in FIG. 13, the pixel data x on the interpolation pixel X in the conventional method will be compared with that in the first proposed method. However, we would like to herein explain the difference in the pixel data x on the interpolation pixel X depending on the difference between methods of respectively calculating diagonal correlation values L and R. In the conventional method, therefore, the calculation method by the first proposed method shall be also used for the settable range S.

The first edge component E, the second edge component Es, dmax (the larger one of d13 and d23), dmin (the smaller one of d13 and d23), dc (the average of dmax and dmin), the minimum xa in the settable range S, and the maximum xb in the settable range S are as follows:

$$E=-d03+d13+d23-d33=-1+1+0-0=0$$

$$Es=|d03+d13-d23-d33|=|1+1-0-0|=2$$

$$d\text{min}=0, d\text{max}=1, dc=0.5$$

$$xa=dc-Es\times\gamma s=0.5-2\times\gamma s$$

$$xb=dc+Es\times\gamma s+E\times\gamma=0.5+2\times\gamma s+0\times\gamma=0.5$$

$$-0.5 \leq S \leq 1.5 \text{ when } \gamma s=0.5$$

In the conventional method, a diagonal correlation value is the minimum 0 (xd=xmax−xmin+β1×Hl−β2×Vl=(0−0)+β1×0−β2×0=0) in a direction of an arrow indicated by a broken line in FIG. 13. Consequently, xmin=xmax=0 in FIG. 5. In the case shown in FIG. 13, therefore, the relationship between the correlation value and the pixel data x corresponds to FIG. 5d, so that the pixel data x is (xmin+xmax)/2=0.

That is, in the example shown in FIG. 13, the interpolation pixel X exists between a white portion and a black portion. Accordingly, it is preferable that the pixel data x is 0.5. In the conventional method, however, the correlation value in the direction of the arrow indicated by the broken line is the minimum. Accordingly, the pixel data x is black (0), whereby a step occurs in an interpolated portion.

Contrary to this, in the first proposed method, a correlation value xd in a direction of an arrow indicated by a broken line in FIG. 13 is as follows:

$$Xd=x\text{max}-x\text{min}+\beta 1\times Hl-\beta 2\times Vl=(0-0)+\beta 1\times 3-\beta 2\times 0=3\beta 1$$

Furthermore, a correlation value xd in a direction of an arrow indicated by a solid line is as follows:

$$xd=x\text{max}-x\text{min}+\beta 1\times Hl-\beta 2\times Vl=(1-0)+\beta 1\times 1-\beta 2\times 0=1+\beta 1$$

When β1>0.5 is set, the correlation value in the direction of the arrow indicated by the broken line > the correlation value in the direction of the arrow indicated by the solid line, so that the correlation value in the direction of the arrow indicated by the solid line is the minimum. Consequently, xmin=0 and xmax=1. In the case shown in FIG. 13, therefore, the relationship between the correlation value and the pixel data x corresponds to FIG. 5d as in the conventional method. However, the pixel data x is (xmin+xmax)/2=0.5, whereby no step occurs in an interpolated portion.

[3] Description of Second Embodiment

Description is now made of an image interpolating method according to a second embodiment of the present invention (hereinafter referred to as a second proposed method).

The second proposed method is approximately the same as the first proposed method except for only methods of respectively calculating horizontal correlation intensities Hl and Hr used in calculating diagonal correlation values L and R.

Description is made of the basic ideas of the methods of respectively calculating Hl and Hr. Since the basic ideas of the methods of respectively calculating Hl and Hr are the same, description is herein made of the basic idea of the method of calculating Hl.

Hl is defined as the larger one of a horizontal correlation intensity on the side of an upper opposed pixel (D12 shown in FIG. 1 in this example) and a horizontal correlation intensity on the side of a lower opposed pixel (D24 shown in FIG. 1 in this example).

The sum of a secondary differential value in the horizontal direction corresponding to an original pixel just above a target original pixel, a value which is two times a secondary differential value in the horizontal direction corresponding to the target original pixel, and a secondary differential value in the horizontal direction corresponding to an original pixel just below the target original pixel is defined as a horizontal correlation intensity in a predetermined region (a region of 3 pixels by 3 pixels) centered around the target original pixel.

Suppose a pixel just above an interpolation pixel X is a first original pixel, and a pixel just below the interpolation pixel X is a second original pixel. In this case, when the upper opposed pixel is the first pixel in the horizontal direction from the first original pixel, and the lower opposed pixel is the first pixel in the horizontal direction from the second original pixel, the horizontal correlation intensity on the side of the upper opposed pixel is a horizontal correlation intensity in a predetermined region centered around the opposed pixel, and the horizontal correlation intensity on the side of the lower opposed pixel is horizontal correlation intensity in a predetermined region centered around the opposed pixel.

When the upper opposed pixel is the n-th pixel in the horizontal direction from the first original pixel, and the lower opposed pixel is the n-th pixel in the horizontal direction from the second original pixel, the horizontal correlation intensity on the side of the upper opposed pixel is a value obtained by adding the sum of horizontal correlation intensities in predetermined regions centered around the original pixels between the first original pixel and the opposed pixel to the horizontal correlation intensity in the predetermined regions centered around the opposed pixel. The horizontal correlation intensity on the side of the lower opposed pixel is a value obtained by adding the sum of horizontal correlation intensities in predetermined regions centered around the original pixels between the second original pixel and the opposed pixel to the horizontal correlation intensity in the predetermined region centered around the opposed pixel.

Description is made of horizontal correlation intensities $Hl_1$, $Hl_2$, $Hr_1$, and $Hr_2$ used for respectively calculating correlation values L1, L2, R1, and R2 shown in FIG. 6.

$Hl_1$ is expressed by the following equation (36), letting AL1 be a horizontal correlation intensity in a predetermined region centered around the upper opposed pixel D12 and letting BL1 be a horizontal correlation intensity in a predetermined region centered around the lower opposed pixel D24:

$$Hl_1=\text{MAX}[AL1,BL1]=\text{MAX}[\{(|-d03+2*d02-d01|)+2(|-d13+2*d12-d11|)+(|-d23+2*d22-d21|)\}, \{(|-d13+2*d14-d15|)+2(|-d23+2*d24-d25|)+(|-d33+2*d34-d35|)\}] \quad (36)$$

That is, the horizontal correlation intensity on the side of the upper opposed pixel D12 is equal to the horizontal correlation intensity AL1 in the predetermined region centered around the upper opposed pixel D12, and is represented by the sum of a secondary differential value (|−d03+2*d02−d01|) in the horizontal direction corresponding to the pixel D02 just above the opposed pixel D12, a value which is two times a secondary differential value (|−d13+2*d12− d11|) in the horizontal direction corresponding to the opposed pixel D12, and a secondary differential value (|−d23+2*d22−d21|) in the horizontal direction corresponding to the pixel D22 just below the opposed pixel D12.

The horizontal correlation intensity on the side of the lower opposed pixel D24 is equal to the horizontal correlation intensity BL1 in the predetermined region centered around the lower opposed pixel D24, and is represented by the sum of a secondary differential value (|−d13+2*d14−d15|) in the horizontal direction corresponding to the pixel D14 just above the opposed-pixel D24, a value which is two times a secondary differential value (|−d23+2*d24−d25|) in the horizontal direction corresponding to the opposed pixel D24, and a secondary differential value (|−d33+2*d34−d35|) in the horizontal direction corresponding to the pixel D34 just below the opposed pixel D24.

Furthermore, Hl$_2$ is expressed by the following equation (37) in accordance with the basic idea of the above-mentioned calculation method, letting AL1 be the horizontal correlation intensity in the predetermined region centered around the pixel D12, AL2 be a horizontal correlation intensity in a predetermined region centered around a pixel D11, BL1 be the horizontal correlation intensity in the predetermined region centered around the pixel D24, and BL2 be a horizontal correlation intensity in a predetermined region centered around a pixel 25:

$$Hl_2 = \text{MAX}[AL1+AL2, BL1+BL2] = \text{MAX}[\{AL1+(|-d02+2*d01-d00|)+2(|-d12+2*d11-d10|)+(|-d22+2*d21-d20|)\}, \{BL1+(|-d14+2*d15-d16|)+2(|-d24+2*d25-d26|)+(|-d34+2*d35-d36|)\}] \quad (37)$$

Hr$_1$ is expressed by the following equation (38), letting AR1 be a horizontal correlation intensity in a predetermined region centered around an upper opposed pixel D14 and letting BR1 be a horizontal correlation intensity in a predetermined region centered around a lower opposed pixel D22:

$$Hr_1 = \text{MAX}[AR1, BR1] = \text{MAX}[\{(|-d03+2*d04-d05|)+2(|-d13+2*d14-d15|)+(|-d23+2*d24-d25|)\}, \{(|-d13+2*d12-d11|)+2(|-d23+2*d22-d21|)+(|-d33+2*d32-d31|)\}] \quad (38)$$

Furthermore, Hr$_2$ is expressed by the following equation (39) in accordance with the basic idea of the above-mentioned calculation method, letting AR1 be the horizontal correlation intensity in the predetermined region centered around the pixel D14, AR2 be a horizontal correlation intensity in a predetermined region centered around a pixel D15, BR1 be the horizontal correlation intensity in the predetermined region centered around the pixel D22, and BR2 be a horizontal correlation intensity in a predetermined region centered around a pixel D21:

$$Hr_2 = \text{MAX}[AR1+AR2, BR1+BR2] = \text{MAX}[\{AR1+(|-d04+2*d05-d06|)+2(|-d14+2*d15-d16|)+(|-d24+2*d25-d26|)\}, \{BR1+(|-d12+2*d11-d10|)+2(|-d22+2*d21-d20|)+(|-d32+2*d31-d01|)\}] \quad (39)$$

[4] Comparison between First Proposed Method and Second Proposed Method

Figure 14:
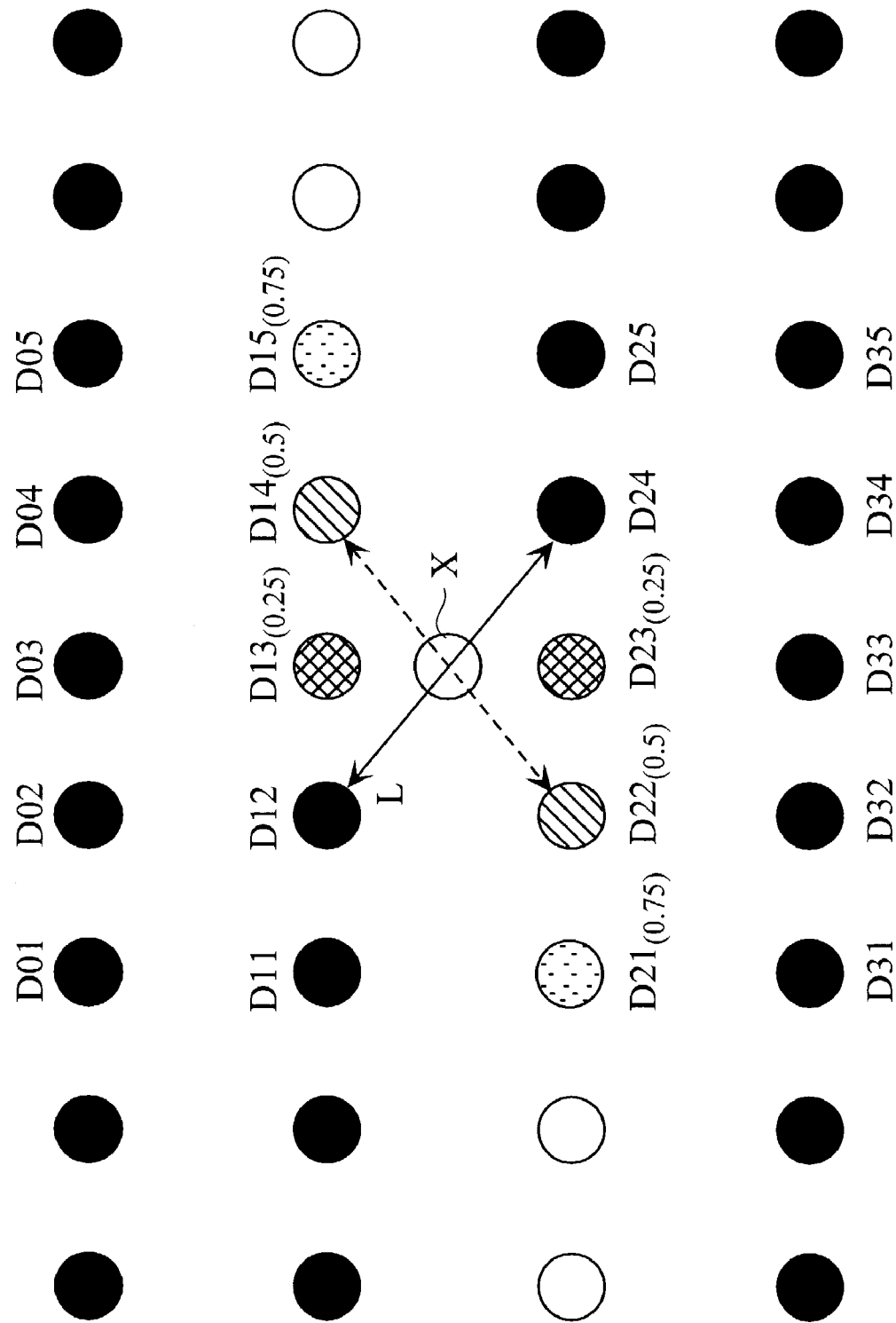
FIG. 14 is a schematic view showing a specific example for comparing a first proposed method and a second proposed method.

Suppose a case where the pixel values of pixels peripheral to an interpolation pixel X are pixel values as shown in FIG. 14. In FIG. 14, a black circle indicates black (a pixel value 0), and a white circle indicates white (a pixel value 1). Pixel data d13 and d23 on pixels D13 and D23 are respectively 0 and 25, pixel data d14 and d22 on pixels D14 and D22 are 0.5, and pixel data d15 and d21 on pixels D15 and D21 are 0.75. In the example shown in FIG. 14, the pixel data x on the interpolation pixel X in the first proposed method will be compared with that in the second proposed method.

In both the first proposed method and the second proposed method, a first edge component E, a second edge component Es, dmax (the larger one of d13 and d23), dmin (the smaller one of d13 and d23), dc (the average of dmax and dmin), the minimum xa in a settable range S, and the maximum xb in the settable range S are as follows:

$$E = -d03+d13+d23-d33 = -0+0.25+0.25-0 = 0.5$$

$$Es = |d03+d13-d23-d33| = |0+0.25-0.25-0| = 0$$

$$d\text{min} = 0.25, \, d\text{max} = 0.25, \, dc = 0.25$$

$$xa = dc - Es \times \gamma s = 0.25 - 0 \times \gamma s = 0.25$$

$$xb = dc + Es \times \gamma s + E \times \gamma = 0.25 + 0 \times \gamma s + 0.5 \times \gamma = 0.25 + 0.5 \times \gamma$$

$$0.25 \leq = S \leq = 0.5 \text{ when } \gamma = 0.5$$

In the first proposed method, Hr and Vr used for respectively calculating the correlation values in the direction of the arrow indicated by the broken line in FIG. 13 and the correlation value xd are as follows:

$$Hr = \text{MAX}[2(|0.25-0.5|+|0.5-0.75|)+|0.25-0|, |0.25-0|+2(|0.25-0.5|+|0.5-0.75|)] = 1.25$$

$$Vr = \text{MIN}(|0.5-0|+|0.5-0|, |0.5-0|+|0.5-0|) = 1.0$$

$$xd = x\text{max} - x\text{min} + \beta1 \times Hr - \beta2 \times Vr = (0.5-0.5) + 1.25 \times \beta1 - 1.0 \times \beta2 = 1.25 \times \beta1 - 1.0 \times \beta2$$

Furthermore, in the first proposed method, Hl and Vl used for respectively calculating the correlation values in the direction of the arrow indicated by the solid line in FIG. 13 and the correlation value xd are as follows:

$$Hl = \text{MAX}[|0.25-0.5|+|0.5-0.75|+2(|0.25-0|), |0.25-0.5|+|0.5-0.75|+2(|0.25-0|)] = 1.0$$

$$Vl = \text{MIN}(|0.5-0|, |0.5-0|) = 0.5$$

$$xd = x\text{max} - x\text{min} + \beta1 \times Hl - \beta2 \times Vl$$
$$= (0-0) + 1.0 \times \beta1 - 0.5 \times \beta2$$
$$= 1.0 \times \beta1 - 0.5 \times \beta2$$

When $\beta2 < (\beta1/2)$ is set, the correlation value in the direction of the arrow indicated by the solid line is the minimum. Consequently, xmin=xmax=0 in FIG. 5. In the case shown in FIG. 13, therefore, the relationship between the correlation value and the pixel data x corresponds to FIG. 5b, so that the pixel data x is xa=0.25 (a value close to black) whereby a fractured portion occurs in a white diagonal line.

On the other hand, in the second proposed method, Hr and Vr used for respectively calculating correlation values in the direction of an arrow indicated by a broken line in FIG. 13 and the correlation value xd are as follows:

$$Hr = \text{MAX}[|-0+2 \times 0 - 0| + 2(|-0.25+2 \times 0.5 - 0.75|) +$$
$$|-0.25+2 \times 0 - 0|, |-0.25+2 \times 0 - 0| +$$
$$2(|-0.25+2 \times 0.5 - 0.75|) + |-0 +$$
$$2 \times 0 - 0|] = 0.25$$

$$Vr=\text{MIN}(|0.5-0|+|0.5-0|, |0.5-0|+|0.5-0|)=1.0$$

$$xd=x\max-x\min+\beta1\times Hr-\beta2\times Vr=(0.5-0.5)+0.25\times\beta1-1.0\times\beta2=0.25\times\beta1-1.0\times\beta2$$

Furthermore, in the second proposed method, Hl and Vl used for respectively calculating correlation values in the direction of an arrow indicated by a solid line in FIG. 13 and the correlation value xd are as follows:

$$Hl=\text{MAX}[|-0+2\times0-0|+2(|-0.25+2\times0-0|)+|-0.25+2\times 0.5-0.75|, |-0.25+2\times0.5-0.75|+2(|-0.25+2\times0-0|)+|-0+2\times0-0|]=0.5$$

$$Vl=\text{MIN}(|0.5-0|, |0.5-0|)=0.5$$

$$xd = x\max - x\min + \beta1 \times Hl - \beta2 \times Vl =$$
$$(0-0) + 0.5\times\beta1 - 0.5\times\beta2 = 0.5\times\beta1 - 0.5\times\beta2$$

Therefore, the correlation value in the direction of the arrow indicated by the broken line is the minimum irrespective of the values of β1 and β2. Consequently, xmin=xmax=0.5 in FIG. 5. In the case shown in FIG. 13, therefore, the relationship between the correlation value and the pixel data x corresponds to FIG. 5a, so that the pixel data x is xb=0.5, whereby no fractured portion occurs in a white diagonal line.

[3] Description of Third Embodiment

Description is now made of an image interpolating method according to a third embodiment of the present invention (hereinafter referred to as a third proposed method).

The third proposed method is approximately the same as the second proposed method except for only methods of respectively calculating horizontal correlation intensities Hl, Hr, Vl, and Vr used in calculating diagonal correlation values L and R.

In the third proposed method, each of the horizontal correlation intensities Hl and Hr is defined as the sum of a horizontal correlation intensity on the side of an upper opposed pixel and a horizontal correlation intensity on the side of a lower opposed pixel. The definition of the horizontal correlation intensity on the side of the upper opposed pixel and the horizontal correlation intensity on the side of the lower opposed pixel is the same as that in the second proposed method.

Description is made of horizontal correlation intensities $Hl_1$, $Hl_2$, $Hr_1$, and $Hr_2$ used for respectively calculating correlation values L1, L2, R1, and R2 shown in FIG. 6.

$Hl_1$ is expressed by the following equation (40), letting AL1 be a horizontal correlation intensity in a predetermined region centered around an upper opposed pixel D12 and letting BL1 be a horizontal correlation intensity in a predetermined region centered around a lower opposed pixel D24:

$$Hl_1=[AL1+BL1]=[\{(|-d03+2*d02-d01|)+2(|-d13+2*d11|)+(|-d23+2*d22-d21|)\}+\{(|-d13+2*d14-d15|)+2(|-d23+2*d24-d25|)+(|-d33+2*d34-d35|)\}] \quad (40)$$

Furthermore, $Hl_2$ is expressed by the following equation (41), letting AL1 be the horizontal correlation intensity in the predetermined region centered around the pixel D12, AL2 be a horizontal correlation intensity in a predetermined region centered around a pixel D11, BL1 be the horizontal correlation intensity in the predetermined region centered around the pixel D24, and BL2 be a horizontal correlation intensity in a predetermined region centered around a pixel D25:

$$Hl_2=[AL1+AL2+BL1+BL2]=[\{AL1+(|-d02+2*d01-d00|)+2(|-d12+2*d11-d10|)+(|-d22+2*d21-d20|)\}+\{BL1+(|-d14+2*d15-d16|)+2(|-d24+2*d25-d26|)+(|-d34+2*d35-d36|)\}] \quad (41)$$

$Hr_1$ is expressed by the following equation (42), letting AR1 be a horizontal correlation intensity in a predetermined region centered around an upper opposed pixel D14 and letting BR1 be a horizontal correlation intensity in a predetermined region centered around a lower opposed pixel D22:

$$Hr_1=[AR1+BR1]=[\{(|-d03+2*d04-d05|)+2(|-d13+2*d14-d15|)+(|-d23+2*d24-d25|)\}+\{(|-d13+2*d12-d11|)+2(|-d23+2*d22-d21|)+(|-d33+2*d32-d31|)\}] \quad (42)$$

Furthermore, $Hr_2$ is expressed by the following equation (43), letting AR1 be the horizontal correlation intensity in the predetermined region centered around the pixel D14, AR2 be a horizontal correlation intensity in a predetermined region centered around a pixel D15, BR1 be the horizontal correlation intensity in the predetermined region centered around the pixel D22, and BR2 be a horizontal correlation intensity in a predetermined region centered around a pixel D21:

$$Hr_2=[AR1+AR2+BR1+BR2]=[\{AR1+(|-d04+2*d05-d06|)+2(|-d14+2*d15-d16|)+(|-d24+2*d25-d26|)\}+\{BR1+(|-d12+2*d11-d10|)+2(|-d22+2*d21-d20|)+(|-d32+2*d31-d01|)\}] \quad (43)$$

In the third proposed method, each of the vertical correlation intensities Vl and Vr is defined as the sum of a vertical correlation intensity on the side of the upper opposed pixel and a vertical correlation intensity on the side of the lower opposed pixel. The vertical correlation intensity on the side of the upper opposed pixel is a secondary differential value in the vertical direction corresponding to the opposed pixel, and the vertical correlation intensity on the side of the lower opposed pixel is a secondary differential value in the vertical direction corresponding to the opposed pixel.

Description is made of the vertical correlation intensities $Vl_1$ and $Vr_1$ used for respectively calculating the correlation values L1 and R1 shown in FIG. 6.

The vertical correlation intensity $Vl_1$ is expressed by the following equation (44):

$$Vl_1=(|-d02+2*d12-d22|+|-d14+2*d24-d34|) \quad (44)$$

Furthermore, the vertical correlation intensity $Vr_1$ is expressed by the following equation (45):

$$Vr_1=(|-d04+2*d14-d24|+|-d12+2*d22-d32|) \quad (45)$$

[6] As to Modified Examples of First Proposed Method and Second Proposed Method

In the first proposed method or the second proposed method, a diagonal correlation intensity, as described below, may be added in calculating diagonal correlation values L and R.

That is, the diagonal correlation intensity is the larger one of diagonal correlation values positioned above and below a diagonal line currently referred to.

Figure 15:
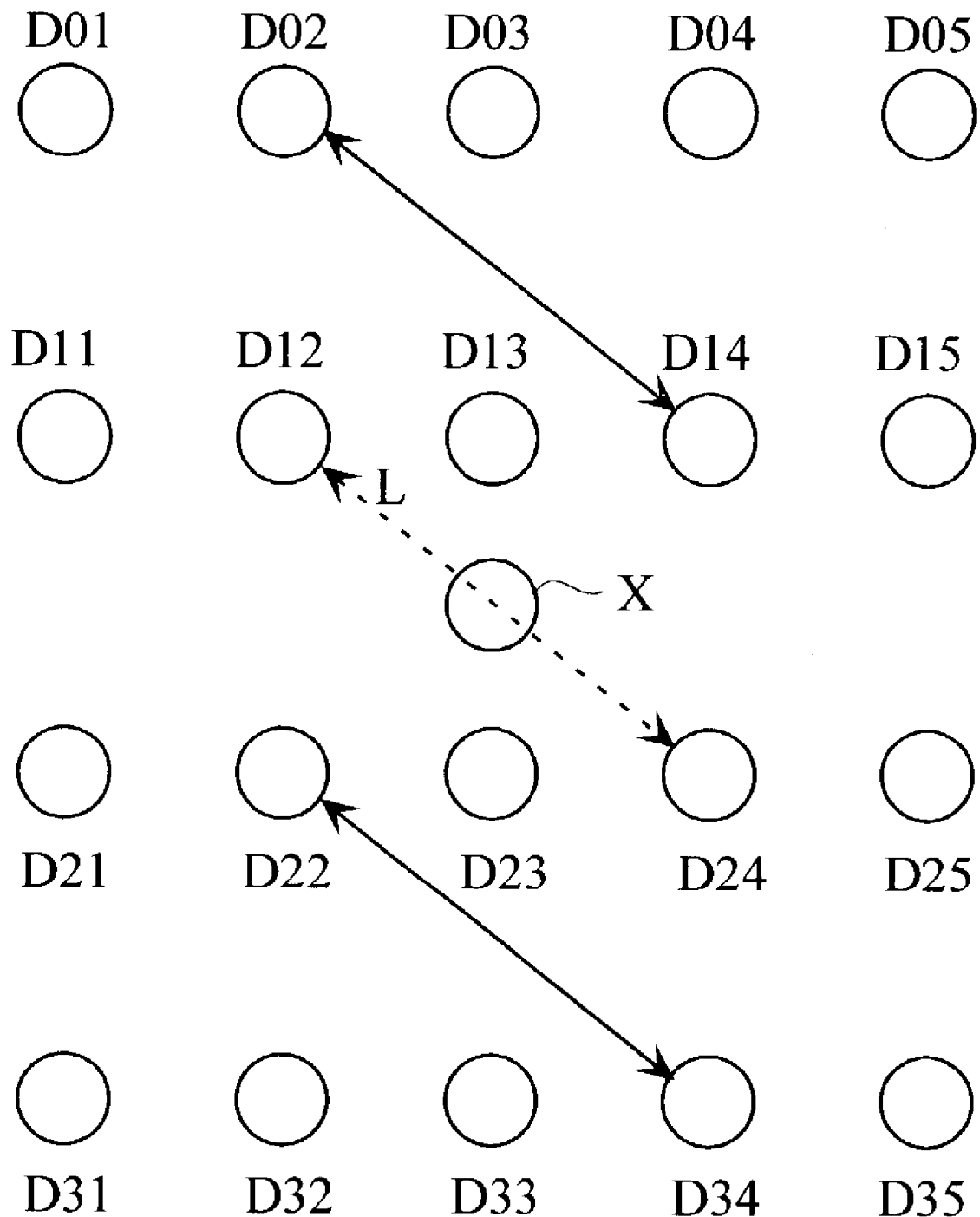
FIG. 15 is a schematic view for explaining modified examples of a first proposed method and a second proposed method.

In calculating the correlation value L in a direction of an arrow indicated by a broken line in FIG. 15, for example, the diagonal correlation intensity is the larger one of a correlation value |d02−d14| on a diagonal line (D02−D14) above a diagonal line indicated by the broken line and a correlation value |d22−d34| on a diagonal line (D22−D34) below the diagonal line.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an image interpolating method for interpolating a pixel at an intermediate position between a first original pixel and a second original pixel adjacent to the first original pixel, an image interpolating method comprising:

a first step of calculating an edge component for judging whether or not an interpolation pixel exists in the vicinity of an edge position of original image data;

a second step of finding a range where pixel data on the interpolation pixel is settable on the basis of the edge component and pixel data on the first and second original pixels;

a third step of selecting a plurality of sets of opposed pixels between which the interpolation pixel is sandwiched diagonally, and finding for each of the sets the pixel data on the interpolation pixel in a case where a correlation value represented by the sum of the absolute values of the differences between the pixel data on the interpolation pixel and pixel data on the opposed pixels and a correction value calculated on the basis of the pixel data on the original pixel peripheral to each of the opposed pixels is the minimum in the range where the pixel data on the interpolation pixel is settable and the minimum correlation value;

a fourth step of finding temporary pixel data on the interpolation pixel on the basis of the pixel data on the interpolation pixel in the case where the correlation value is the minimum and the minimum correlation value which are found for each of the sets;

a fifth step of calculating a linear correlation value and a linear interpolation value between the first original pixel and the second original pixel; and a sixth step of calculating the final pixel data on the interpolation pixel on the basis of the minimum correlation value found in the third step, the linear correlation value calculated in the fifth step, the temporary pixel data calculated in the fourth step, and the linear interpolation value calculated in the fifth step, wherein assuming that an original pixel adjacent to the first original pixel and opposite to the second original pixel is a third original pixel, and an original pixel adjacent to the second original pixel and opposite to the first original pixel is a fourth original pixel, and letting d1 be the pixel data on the first original pixel, d2 be the pixel data on the second original pixel, d3 be pixel data on the third original pixel, and d4 be pixel data on the fourth original pixel, a first edge component E is calculated on the basis of an equation for operation $E = -d3+d1+d2-d4$, and a second edge component Es is calculated on the basis of an equation for operation $Es = |d3+d1-d2-d4|$ in the first step, and wherein letting E be the first edge component found in the first step, Es be the second edge component found in the first step, dc be the average of the pixel data on the first original pixel and the pixel data on the second original pixel, and γs and γ be predetermined factors, a range S where the pixel data on the interpolation pixel is settable is found on the basis of the following expressions in the second step:

if $E \geq 0$, then $dc - Es \times \gamma s \leq S \leq dc + Es \times \gamma s + E \times \gamma$, if $E \leq 0$, then $dc - Es \times \gamma s + E \times \gamma \leq S \leq dc + Es \times \gamma s$.

2. In an image interpolating method for interpolating a pixel at an intermediate position between a first original pixel and a second original pixel adjacent to the first original pixel, an image interpolating method comprising:

a first step of calculating an edge component for judging whether or not an interpolation pixel exists in the vicinity of an edge position of original image data;

a second step of finding a range where pixel data on the interpolation pixel is settable on the basis of the edge component and pixel data on the first and second original pixels;

a third step of selecting a plurality of sets of opposed pixels between which the interpolation pixel is sandwiched diagonally, and finding for each of the sets the pixel data on the interpolation pixel in a case where a correlation value represented by the sum of the absolute values of the differences between the pixel data on the interpolation pixel and pixel data on the opposed pixels and a correction value calculated on the basis of the pixel data on the original pixel peripheral to each of the opposed pixels is the minimum in the range where the pixel data on the interpolation pixel is settable and the minimum correlation value;

a fourth step of finding temporary pixel data on the interpolation pixel on the basis of the pixel data on the interpolation pixel in the case where the correlation value is the minimum and the minimum correlation value which are found for each of the sets;

a fifth step of calculating a linear correlation value and a linear interpolation value between the first original pixel and the second original pixel; and a sixth step of calculating the final pixel data on the interpolation pixel on the basis of the minimum correlation value found in the third step, the linear correlation value calculated in the fifth step, the temporary pixel data calculated in the fourth step, and the linear interpolation value calculated in the fifth step, wherein when a direction connecting the first original pixel and the second original pixel is defined as an up-and-down direction, and a direction perpendicular to the up-and-down direction is defined as a right-and-left direction, assuming that the first original pixel is just above the second original pixel, and letting D12 and D24 be respectively the upper opposed pixel and the lower opposed pixel in the set of opposed pixels between which the interpolation pixel is sandwiched diagonally, d12 and d24 be respectively the pixel data on the opposed pixels D12 and D24, β1 and β2 be respectively predetermined factors, Hl be the larger one of a horizontal correlation intensity on the side of the one opposed pixel D12 and a horizontal correlation intensity on the side of the other opposed pixel D24, Vl be the smaller one of a vertical correlation intensity on the side of the one opposed pixel D12 and a vertical correlation intensity on the side of the other opposed pixel D24, and x be the pixel data within the settable range S found in the second step, an equation for calculating a correlation value L corresponding to the set is expressed by the following equation:

$$L=|d12-x|+|d24-x|+\beta1 \cdot Hl-\beta2 \cdot Vl.$$

3. The image interpolating method according to claim 2, wherein
the vertical correlation intensity on the side of the upper opposed pixel D12 is a primary differential value in the vertical direction corresponding to the opposed pixel, and
the vertical correlation intensity on the side of the lower opposed pixel D24 is a primary differential value in the vertical direction corresponding to the opposed pixel.

4. The image interpolating method according to claim 2, wherein
the vertical correlation intensity on the side of the upper opposed pixel D12 is a secondary differential value in the vertical direction corresponding to the opposed pixel, and
the vertical correlation intensity on the side of the lower opposed pixel D24 is a secondary differential value in the vertical direction corresponding to the opposed pixel.

5. The image interpolating method according to either one of claims 3 and 4, wherein
when the sum of a primary differential value in the horizontal direction corresponding to an original pixel just above a target original pixel, a value which is two times a primary differential value in the horizontal direction corresponding to the target original pixel, and a primary differential value in the horizontal direction corresponding to an original pixel just below the target original pixel is defined as a horizontal correlation intensity in a predetermined region centered around the target original pixel,
in a case where the upper opposed pixel D12 is the first pixel in the horizontal direction from the first original pixel, and the lower opposed pixel D24 is the first pixel in the horizontal direction from the second original pixel,
the horizontal correlation intensity on the side of the upper opposed pixel D12 is a horizontal correlation intensity in a predetermined region centered around the opposed pixel D12, and
the horizontal correlation intensity on the side of the lower opposed pixel D24 is a horizontal correlation intensity in a predetermined region centered around the opposed pixel D24.

6. The image interpolating method according to claim 5, wherein
when the upper opposed pixel D12 is the n-th pixel in the horizontal direction from the first original pixel, and the lower opposed pixel D24 is the n-th pixel in the horizontal direction from the second original pixel,
the horizontal correlation intensity on the side of the upper opposed pixel D12 is a value obtained by adding the sum of horizontal correlation intensities in predetermined regions centered around the original pixels between the first original pixel and the opposed pixel D12 to the horizontal correlation intensity in the predetermined region centered around the opposed pixel D12, and
the horizontal correlation intensity on the side of the lower opposed pixel D24 is a value obtained by adding the sum of horizontal correlation intensities in predetermined regions centered around the original pixels between the second original pixel and the opposed pixel D24 to the horizontal correlation intensity in the predetermined region centered around the opposed pixel D24.

7. The image interpolating method according to either one of claims 3 and 4, wherein
when the sum of a secondary differential value in the horizontal direction corresponding to an original pixel just above a target original pixel, a value which is two times a secondary differential value in the horizontal direction corresponding to the target original pixel, and a secondary differential value in the horizontal direction corresponding to an original pixel just below the target original pixel is defined as a horizontal correlation intensity in a predetermined region centered around the target original pixel,
in a case where the upper opposed pixel D12 is the first pixel in the horizontal direction from the first original pixel, and the lower opposed pixel D24 is the first pixel in the horizontal direction from the second original pixel,
the horizontal correlation intensity on the side of the upper opposed pixel D12 is a horizontal correlation intensity in a predetermined region centered around the opposed pixel D12, and
the horizontal correlation intensity on the side of the lower opposed pixel D24 is a horizontal correlation intensity in a predetermined region centered around the opposed pixel D24.

8. The image interpolating method according to claim 7, wherein
when the upper opposed pixel D12 is the n-th pixel in the horizontal direction from the first original pixel, and the lower opposed pixel D24 is the n-th pixel in the horizontal direction from the second original pixel,
the horizontal correlation intensity on the side of the upper opposed pixel D12 is a value obtained by adding the sum of horizontal correlation intensities in predetermined regions centered around the original pixels between the first original pixel and the opposed pixel D12 to the horizontal correlation intensity in the predetermined region centered around the opposed pixel D12, and
the horizontal correlation intensity on the side of the lower opposed pixel D24 is a value obtained by adding the sum of horizontal correlation intensities in predetermined regions centered around the original pixels between the second original pixel and the opposed pixel D24 to the horizontal correlation intensity in the predetermined region centered around the opposed pixel D24.

9. The image interpolating method according to claim 1, wherein
when a direction connecting the first original pixel and the second original pixel is defined as an up-and-down direction, and a direction perpendicular to the up-and-down direction is defined as a right-and-left direction, assuming that the first original pixel is just above the second original pixel, and letting D12 and D24 be respectively the upper opposed pixel and the lower opposed pixel in the set of opposed pixels between which the interpolation pixel is sandwiched diagonally, d12 and d24 be respectively the pixel data on the opposed pixels D12 and D24, $\beta1$ and $\beta2$ be respectively predetermined factors, Hl be the sum of a horizontal correlation intensity on the side of the one opposed pixel D12 and a horizontal correlation intensity on the side of the other opposed pixel D24, Vl be the sum of a vertical correlation intensity on the side of the one opposed pixel D12 and a vertical correlation intensity on the side of the other opposed pixel D24, and x be the pixel data in the settable range S found in the third step, an equation for calculating a correlation value L corresponding to the set is expressed by the following equation:

$$L=|d12-x|+|d24-x|+\beta 1\cdot Hl-\beta 2\cdot Vl.$$

10. The image interpolating method according to claim 9, wherein
the vertical correlation intensity on the side of the upper opposed pixel D12 is a secondary differential value in the vertical direction corresponding to the opposed pixel, and
the vertical correlation intensity on the side of the lower opposed pixel D24 is a secondary differential value in the vertical direction corresponding to the opposed pixel.

11. The image interpolating method according to claim 10, wherein
when the sum of a secondary differential value in the horizontal direction corresponding to an original pixel just above a target original pixel, a value which is two times a secondary differential value in the horizontal direction corresponding to the target original pixel, and a secondary differential value in the horizontal direction corresponding to an original pixel just below the target original pixel is defined as a horizontal correlation intensity in a predetermined region centered around the target original pixel,
in a case where the upper opposed pixel D12 is the first pixel in the horizontal direction from the first original pixel, and the lower opposed pixel D24 is the first pixel in the horizontal direction from the second original pixel,
the horizontal correlation intensity on the side of the upper opposed pixel D12 is a horizontal correlation intensity in a predetermined region centered around the opposed pixel D12, and
the horizontal correlation intensity on the side of the lower opposed pixel D24 is a horizontal correlation intensity in a predetermined region centered around the opposed pixel D24.

12. The image interpolating method according to claim 11, wherein
when the upper opposed pixel D12 is the n-th pixel in the horizontal direction from the first original pixel, and the lower opposed pixel D24 is the n-th pixel in the horizontal direction from the second original pixel,
the horizontal correlation intensity on the side of the upper opposed pixel D12 is a value obtained by adding the sum of horizontal correlation intensities in predetermined regions centered around the original pixels between the first original pixel and the opposed pixel D12 to the horizontal correlation intensity in the predetermined region centered around the opposed pixel D12, and
the horizontal correlation intensity on the side of the lower opposed pixel D24 is a value obtained by adding the sum of horizontal correlation intensities in predetermined regions centered around the original pixels between the second original pixel and the opposed pixel D24 to the horizontal correlation intensity in the predetermined region centered around the opposed pixel D24.

13. The image interpolating method according to claim 1, wherein
the fourth step comprises the steps of
selecting the minimum of the minimum correlation values found for the sets in the third step,
extracting the pixel data on the interpolation pixel in a case where the selected minimum of the minimum correlation values is given,
determining, when the number of minimums of the minimum correlation values is one, the pixel data on the interpolation pixel in a case where the minimum of the minimum correlation values is given as the temporary pixel data on the interpolation pixel, and
determining, when there are a plurality of minimums of the minimum correlation values, the average of the pixel data on the interpolation pixel in cases where the minimums of the minimum correlation values are respectively given as the temporary pixel data on the interpolation pixel.

14. The image interpolating method according to claim 1, wherein
the fourth step comprises the steps of
selecting the minimum of the minimum correlation values found for the sets in the third step,
extracting the pixel data on the interpolation pixel in a case where the selected minimum of the minimum correlation values is given,
determining, when the number of minimums of the minimum correlation values is one, the pixel data on the interpolation pixel in a case where the minimum of the minimum correlation values is given as the temporary pixel data on the interpolation pixel, and
extracting, when there are a plurality of minimums of the minimum correlation values, the maximum and the minimum of the pixel data on the interpolation pixel in cases where the minimums of the minimum correlation values are respectively given, and determining the average of the extracted maximum and minimum as the pixel data on the interpolation pixel.

15. The image interpolating method according to claim 1, wherein
the fourth step comprises the steps of
selecting the minimum of the minimum correlation values found for the sets in the third step,
extracting the pixel data on the interpolation pixel in a case where the selected minimum of the minimum correlation values is given,
determining, when the number of minimums of the minimum correlation values is one, the pixel data on the interpolation pixel in a case where the minimum of the minimum correlation values is given as the temporary pixel data on the interpolation pixel, and
selecting, when there are a plurality of minimums of the minimum correlation values, the pixel data obtained from the opposed pixel in closest proximity to the interpolation pixel out of the pixel data on the interpolation pixel in cases where the minimums of the minimum correlation values are respectively given, and determining, when the number of selected pixel data is one, the pixel data as the pixel data on the interpolation pixel, while determining, when the number of selected pixel data is two, the average of the pixel data as the pixel data on the interpolation pixel.

16. The image interpolating method according to claim 1, wherein
the sixth step is one of selecting, when the linear correlation value calculated in the fifth step is not more than the minimum correlation value found in the third step, the linear interpolation value calculated in the fifth step as final pixel data on the interpolation pixel, while selecting, when the linear correlation value calculated in the fifth step is more than the minimum correlation value found in the third step, the temporary pixel data calculated in the fourth step as final pixel data on the interpolation pixel.

17. The image interpolating method according to claim 1, wherein the sixth step is one of weighting and adding the linear interpolation value calculated in the fifth step and the temporary pixel data calculated in the fourth step depending on the linear correlation value calculated in the fifth step and the minimum correlation value found in the third step, to calculate the final pixel data on the interpolation pixel.

* * * * *